US006547133B1

(12) United States Patent
DeVries, Jr. et al.

(10) Patent No.: US 6,547,133 B1
(45) Date of Patent: *Apr. 15, 2003

(54) VEHICLE MOUNTED REMOTE TRANSACTION INTERFACE SYSTEM

(75) Inventors: Martin DeVries, Jr., Holland, MI (US); Niall R. Lynam, Holland, MI (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/687,778

(22) Filed: Oct. 13, 2000

Related U.S. Application Data

(63) Continuation of application No. 09/057,428, filed on Apr. 8, 1998.

(51) Int. Cl.⁷ .................................................. G06K 5/00
(52) U.S. Cl. ......................... 235/380; 235/379; 235/384; 235/382.5
(58) Field of Search ..................... 235/379, 380, 235/382.5, 384, 492, 375, 439, 462.43, 382; 359/273, 275, 872; 340/539; 343/713; 705/13, 417, 418; 701/1

(56) References Cited

U.S. PATENT DOCUMENTS

| 3,841,732 A | * | 10/1974 | Marks ........................ 359/296 |
| 4,447,808 A | * | 5/1984 | Marcus ....................... 340/696 |
| 5,012,077 A | * | 4/1991 | Takano ........................ 235/380 |
| 5,072,380 A | | 12/1991 | Randelman et al. ........ 364/406 |
| 5,310,999 A | * | 5/1994 | Claus et al. ................. 235/384 |
| 5,455,716 A | * | 10/1995 | Suman et al. ........... 359/872 X |
| 5,485,520 A | * | 1/1996 | Chaum et al. .......... 235/380 X |
| 5,590,038 A | * | 12/1996 | Pitroda .................... 235/380 X |
| 5,631,638 A | * | 5/1997 | Kaspar et al. ............... 340/902 |
| 5,663,548 A | * | 9/1997 | Hayashi et al. ............. 235/384 |
| 5,680,263 A | * | 10/1997 | Zimmermann et al. ...... 359/872 |
| 5,710,702 A | * | 1/1998 | Hayashi et al. ......... 235/384 X |
| 5,793,027 A | | 8/1998 | Baik .......................... 235/380 |
| 5,872,513 A | | 2/1999 | Fitzgibbon et al. .......... 340/539 |
| 5,878,353 A | * | 3/1999 | ul Azam et al. ............. 455/550 |
| 5,910,854 A | | 6/1999 | Varaprasad et al. ......... 359/273 |
| 5,940,503 A | * | 8/1999 | Palett et al. ................. 379/454 |
| 5,962,833 A | * | 10/1999 | Hayashi ...................... 235/384 |
| 5,995,898 A | | 11/1999 | Tuttle ......................... 701/102 |
| 6,011,518 A | * | 1/2000 | Yamagishi et al. ......... 343/713 |
| 6,098,879 A | * | 8/2000 | Terranova ................... 235/384 |
| 6,158,655 A | * | 12/2000 | DeVries, Jr. et al. ....... 235/380 |

FOREIGN PATENT DOCUMENTS

| DE | 36 05 704 A1 | * | 8/1987 |
| EP | 0 979 758 A1 | * | 2/2000 |
| JP | 11-131880 A | * | 5/1999 |

* cited by examiner

Primary Examiner—Michael G. Lee
Assistant Examiner—Jared J. Fureman
(74) Attorney, Agent, or Firm—Van Dyke, Gardner, Linn & Burkhart, LLP

(57) ABSTRACT

A vehicle mounted remote transaction interface system for communicating with a remote transaction unit for transactions such as a bank transaction with a bank teller unit or a drive-through point-of-sale transaction with a drive-through point-of-sale system for the purchase of food, beverages or other goods. The interface system includes a transmitter and an input device. The transmitter is mounted to a vehicular rearview mirror assembly. The input device is in communication with the transmitter and provides input to the transmitter which modulates the signals from the input device and transmits the modulated signal for communicating with the remote transaction unit in order to engage in a transaction such as with a remote bank teller unit or machine. The input device may, for example, include one or more buttons, a display area, and/or credit/debit card reader.

199 Claims, 7 Drawing Sheets

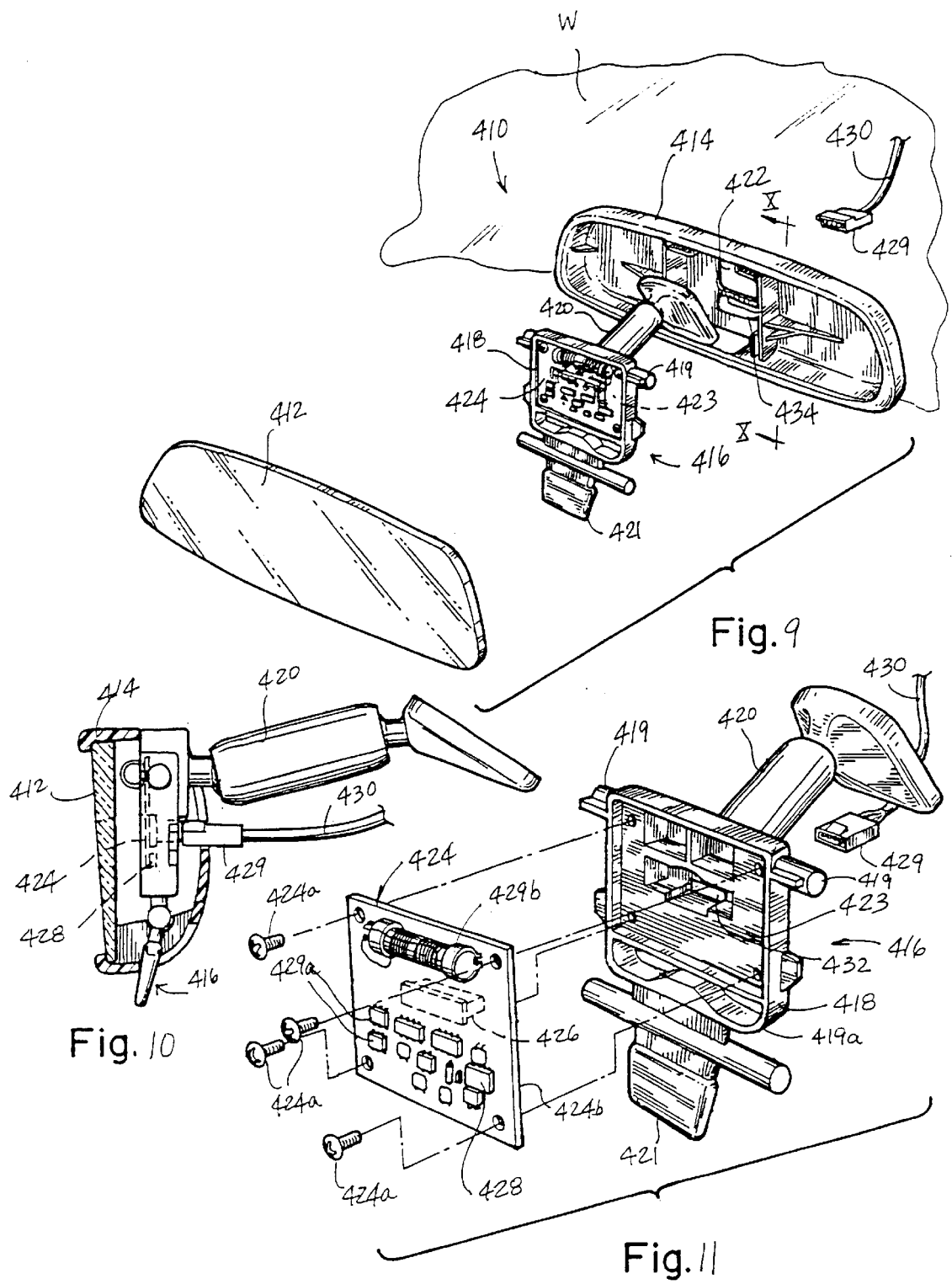

VEHICLE MOUNTED REMOTE TRANSACTION INTERFACE SYSTEM

This is a continuation application of co-pending application Ser. No. 09/057,428, filed Apr. 8, 1998, which is incorporated by reference in its entirety herein.

TECHNICAL FIELD AND BACKGROUND OF THE INVENTION

The present invention relates to an interface system which interacts with a transaction system, and more particularly, to an interface system which is mounted on or in a vehicle and which enables an occupant of the vehicle to engage in a transaction with a vehicle accessible transaction system, for example a drive-through teller at a bank, savings and loan institution, a drive-through food service, or the like.

More and more transactions occur in vehicles. Drive-through food services have been available since at least the 1950's. Since that time, the drive-through phenomena has even reached the sale of pharmaceuticals and soft drinks and other beverages. Today, most gasoline sales are made through electronic gas pumps which accept credit and debit cards. In addition to sales transactions, more and more vehicle occupants engage in banking transactions either through a bank teller window or a remote electronic bank teller or cash machine. While the advent of drive-through-point-of-sale transactions has increased the speed at which the consumer can engage in such transactions, there is a certain level of comfort which is forfeited, especially in climates with extreme temperatures. In order to engage in many such transactions, the window of the vehicle must be lowered for extended periods of time in order to engage in the initial sales transaction and then for the receipt of the goods. Therefore, in hotter or colder climates, the open window can create discomfort for the occupants of the vehicle.

In addition to the time that is required to engage in the financial portion of the transaction and the discomfort which may be experienced when the window is open for an extended period, occupants of vehicles are also exposed to security risks. This is especially true with drive-through-banking-transactions with remote bank tellers or cash machines. More and more, people are approached while there window is down or when they are queued up between two stationary cars. With the window down for extended periods, vehicle occupants are exposed to greater risk of harmful contact with aggressors who may be seeking to steal their bank or credit card, or money which is dispensed from a remote teller or cash machine.

Consequently, there is a need to increase the speed of the financial portion of such transactions and to increase the security associated with such transactions. By increasing the speed of the transaction, the window of opportunity for a thief is reduced and, as an added benefit, the through-put of any individual remote point of sale business is increased. Preferably, such a system will enable the occupant of the vehicle to remain in the car with the windows rolled up and to complete a significantly large portion of the transaction so that the window needs to remain open only for a short duration during the transfer of goods or money.

SUMMARY OF THE INVENTION

The present invention provides a vehicle interface transaction system which permits an occupant of a vehicle to engage in transactions, including bank or sales transactions without exiting the vehicle or even opening the window, at least for the sales portion of the transaction. The interface system, therefore, increases the speed of such transactions as drive-through food sales, including drive-through fast food, drive-through bank transactions, and the like. Components of the interface system may be installed in existing vehicle accessories on the vehicle such as in rearview mirror assemblies, including exterior rearview mirror assemblies.

According to one form of the invention, a vehicle mounted remote transaction interface system for transactions such as those between an occupant of the vehicle and a bank teller or a sales person for goods such as foods and beverages. The system includes a transmitter/transceiver and an input device. The transmitter/transceiver is mounted in one of a vehicle cabin and a vehicular rearview mirror. The input device is in communication with the transmitter/transceiver and provides input to the transmitter/transceiver, which modulates the signals from the input device and transmits the modulated signal for communicating with a remote transaction unit or machine in order to engage in a transaction with the remote transaction unit or machine. Preferably, the input device is adapted to mount in the vehicle and to be accessible by an occupant of the vehicle.

In one aspect, the transmitter/transceiver preferably sends at least one secure signal, such as a rolling code, so that the occupant can use, for example, his or her personal identification number or credit or banking card number without fear of an electronic eavesdropper acquiring his or her numbers. Preferably, the transmitter comprises a transceiver, which is adapted to send and receive signals from the remote transaction machine.

In other aspects, the input device is adapted to receive a personal identification number and/or a credit card number from the occupant of the vehicle, with the number being transmitted by the transmitter/transceiver to the remote transaction unit or machine. Optionally, the input device may comprise a key pad, which includes at least one button or touch key. Preferably, the key pad is adapted to be mounted in a vehicle cabin of a vehicle whereby the key pad is accessible by an occupant of the vehicle. The key pad may also include a display area or area screen, for displaying, for example, a menu of options driven by the button, touch key, or area screen. Additionally, the key pad may include a plurality of alpha-numeric or function buttons or keys.

In further aspects, the transmitter/transceiver is mounted in a housing of an interior rearview mirror. The interior rearview mirror assembly preferably includes a carrier member supported in the housing, with the transmitter/transceiver being mounted on the carrier member. Alternately, the transmitter/transceiver may be mounted in a mirror assembly support. Further, the mirror assembly support may include a display area which displays indicia, for example a menu having a plurality of options. The transmitter/transceiver is preferably in communication with the display area for modulating and transmitting signals which are generated based on a selection made by the occupant from the indicia displayed on the display area. For example, where the display area comprises a touch activated screen, the selection is made by touching one of the displayed options.

In another form of the invention, a vehicular rearview mirror assembly includes a rearview mirror housing with a reflective element. The housing is adapted to mount on a vehicle. A transmitter/transceiver is supported by the housing and is adapted to receive input signals from a vehicle occupant. The transmitter/transceiver modulates the input signals and transmits the modulated signals to a remote transaction unit or machine for at least one of a remote bank transaction and a drive-through point-of-sale transaction.

The rearview mirror assembly may comprise an interior rearview mirror assembly. Optionally, the interior rearview mirror assembly may include a carrier member, such as a circuit board, mounted in its housing, with the transmitter/transceiver being mounted to the carrier member. In one form, the housing includes a manual actuator, with the transmitter/transceiver being mounted on the manual actuator.

In other forms, the rearview mirror assembly comprises an exterior rearview mirror assembly.

Preferably, the transmitter comprises a transceiver, which transmits signals to and receives signals from the one of a remote bank teller unit or machine and a drive-through point-of-sale system. The transceiver may be adapted to receive a personal identification number and/or a credit card number from the occupant of the vehicle for transmitting the number to the remote bank teller unit or drive-through-point-of-sale system.

In further aspects, the vehicular rearview mirror assembly includes an input device, which includes at least one button and which mounts in the vehicle whereby the input device is accessible by an occupant of the vehicle. The input device may includes a button or buttons, a card reader, and display area.

It can be appreciated from the foregoing that the interface system of the present invention permits an occupant of a vehicle to engage in a sales or banking transaction without exiting the car or even opening the window. The interface system may include a variety of input or control devices which generate signals to the transmitter for modulating and subsequent transmission to the bank or business. These input devices may be mounted in the cabin of the vehicle for easy access and, for example, may be mounted to an interior accessory such as an interior rearview mirror assembly or mirror assembly support.

These and other objects, advantages, purposes and features of the invention will become more apparent from a study of the following description taken in conjunction with the drawings.

DESCRIPTION OF THE DRAWINGS

FIG. 9 is an exploded perspective view of a fourth embodiment of an interior rearview mirror assembly with the interface transaction system of the present invention mounted therein;

FIG. 10 is a cross-sectional view taken along line X—X of FIG. 9; and

FIG. 11 is an enlarged perspective view of a manual actuator of the interior rearview mirror assembly of FIG. 9.

DESCRIPTION OF THE PREFERRED EMBODIMENTS

Figure 1:
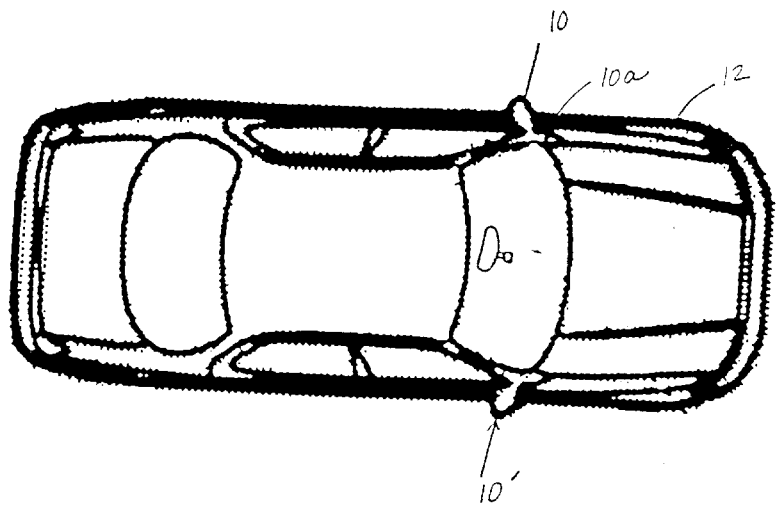
FIG. 1 is a top plan view of a vehicle with an interface transaction system of the present invention mounted therein.

Referring now to the drawings in greater detail, FIG. 1 illustrates an exterior rearview mirror assembly 10 of the present invention mounted to the driver side of a vehicle 12. Rearview mirror assembly 10 may comprise a fixed position exterior rearview mirror or may comprise a break-away rearview mirror assembly which moves between a normal operating position, in which the rearview assembly is extended from the vehicle, to a folded position against the body of the vehicle when the exterior rearview mirror assembly 10 is impacted with sufficient force to cause to the mirror assembly to fold. As will be more fully described below, housed in exterior rearview mirror assembly 10 is at least one component of an interface transaction system of the present invention which allows an occupant of vehicle 12 to communicate with and engage in a transaction with either a remote bank teller or cash unit or machine or a point-of-sale system, such as a drive-through fast food cashier machine or a gas station pump or the like. Optionally, the interface transaction system may communicate with a personal communication service (PCS) to relay messages to the occupant of the vehicle. It should be noted that the components of interface system can be located in a wide variety of locations on or in the vehicle, including for example the exterior of rearview mirror described above or inside the vehicle cabin, including interior mirrors, mirror assembly supports, trim, or the like.

Figure 2:
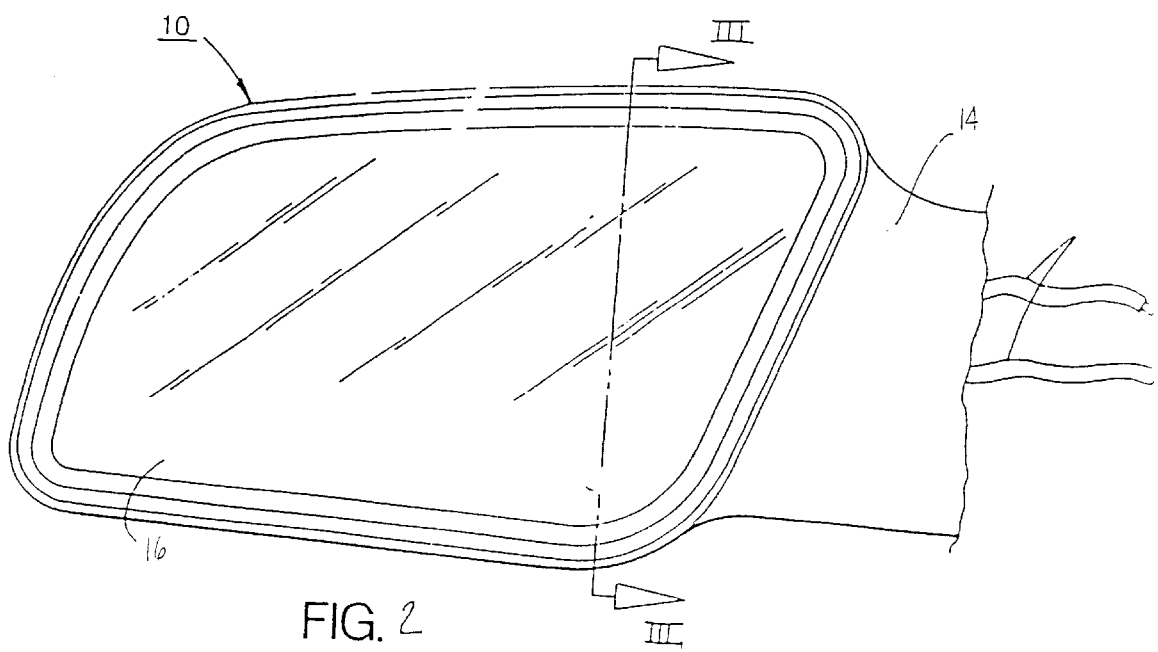
FIG. 2 is a perspective view of an exterior rearview mirror assembly of the vehicle of FIG. 1.
Figure 3:
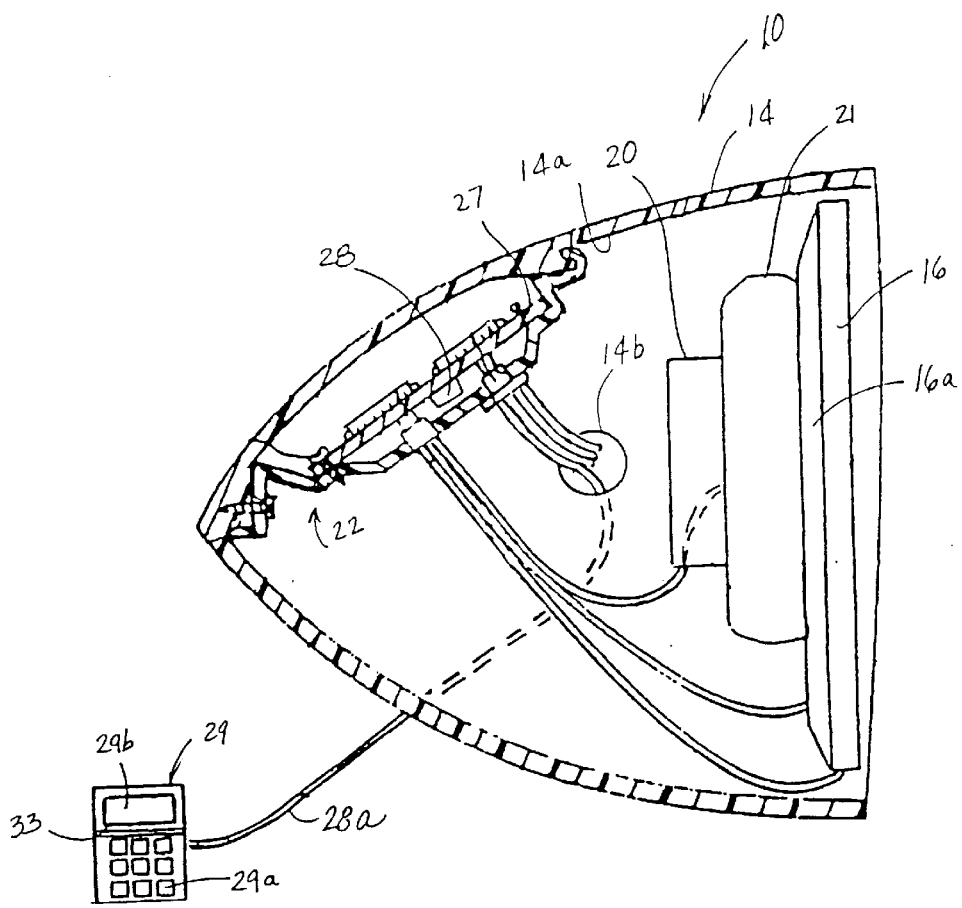
FIG. 3 is a cross-sectional view taken along line III—III of FIG. 2.

As shown in FIG. 2, exterior rearview mirror assembly 10 includes a housing 14 and a reflective element 16 which is supported in housing 14. In this embodiment, reflective element 16 is supported on a backing plate 16a which in turn is supported by a mirror support bracket 20 (FIG. 3). For a fixed mirror assembly, bracket 20 is directly mounted to the body of the vehicle. In contrast for a break-away exterior rearview mirror assembly, bracket 20 is pivotally mounted onto a mounting bracket with, in turn, is directly mounted to the body of the vehicle, as is conventionally known in the rearview mirror art.

Reflective mirror element 16 may comprise a conventional nonelectro optic planar or convex mirror element including a metallic reflector coated glass substrate, such as with a thin chromium or chromium alloy reflector coating, or a non-metallic reflector layer, such as a dichroic layer as described in U.S. Pat. No. 5,207,492 to Robert et al. or a reflector comprising a silicon reflective layer such as described in U.S. Pat. No. 5,535,056 to Caskey et al., which are herein incorporated by reference in their entireties. Alternatively, reflective element 16 may comprise a variable reflective electro optic element, such as electrochromic mirror element comprising one of several types of electrochromic elements, for example an element of the electrochemichromic type, which is disclosed in U.S. Pat. No. 5,140,455 issued to Varaprasad et al., or may be of the solid state type such as disclosed in U.S. Pat. No. 4,712,879 issued to Niall R. Lynam et al., U.S. patent application Ser. No. 08/023,675, filed Feb. 22, 1993, by Varaprasad et al., U.S.

patent application Ser. No. 08/913,557, filed Feb. 8, 1994, by Varaprasad et al., and U.S. patent application Ser. No. 08/238,521, filed Mar. 5, 1994, by Varaprasad et al., all commonly assigned with the present application to Donelly Corporation of Holland, Mich., the disclosures of which are herein incorporated by reference in their entireties. Such electrochromic elements comprise an electrically responsive electrochromic medium that modulates reflectivity from a reflective element. Such electrochromic mirror elements are continuously variable and exhibit multiple reflectant states as the voltage applied thereto is varied. Alternately, reflective element 16 may comprise other electro optic mirror elements such as a liquid crystal mirror and the like. Where reflective element 16 comprises an electrochromic mirror element, the electrochromic mirror element is preferably driven by signals produced by a variable reflectant system of the type disclosed in U.S. patent application Ser. No. 08/316, 047 for a "Modular Variable Reflectant Mirror Assembly", filed Sep. 30, 1994, by Kenneth L. Shierbek et al., now U.S. Pat. No. 5,659,423, which is herein incorporated by reference in its entirety.

Optionally, backing plate 16a may be mounted on an actuator 21 which in turn is mounted to bracket 20. In the illustrated embodiment, actuator 21 comprises an electrical actuator, but it should be understood that actuator 21 may comprise a manually operated actuator, such a Boden cable actuator. Preferably, actuator 21 comprises a dual axis positioning device that permits adjustment of the position of the reflective element 16 and backing plate 16a about both vertical and horizontal axes as is known in the art.

Mounted to the inner wall 14a of housing 14 is an electronic control module 22. Electronic control module 22 includes a carrier member 27, such as a conventional circuit board, for example a PCB, on which one or more electrical or electronic devices, such as antennas and circuitry for rain sensors, and the like, are installed. In preferred form, integral carrier member 27 includes a transceiver 28 of an interface transaction system of the present invention mounted thereto. Transceiver 28 is adapted to communicate with a remote receiver, for example, a receiver of a remote bank teller or cash unit or machine in order to engage in a transaction with a bank, as will be more fully described below. Transceiver 28 may also be adapted to communicate with a drive-through-point-of-sale transaction system, including, for example a drive-through food service or drive-through pharmacy service, or the like. In addition, transceiver 28 may be adapted to communicate with a gas pump payment system. Preferably, transceiver 28 includes a transmitter, such as a radio frequency transmitter, infrared transmitter or the like, and a receiver, such as radio frequency receiver, an infrared receiver or the like. Optionally, transceiver 28 may include a learning function, for example transceiver 28 may be a trainable transceiver. Furthermore, the term "communicate with" is used in its broadest sense and includes connect to, interface with, or interact with the various systems mentioned above.

Figure 4:
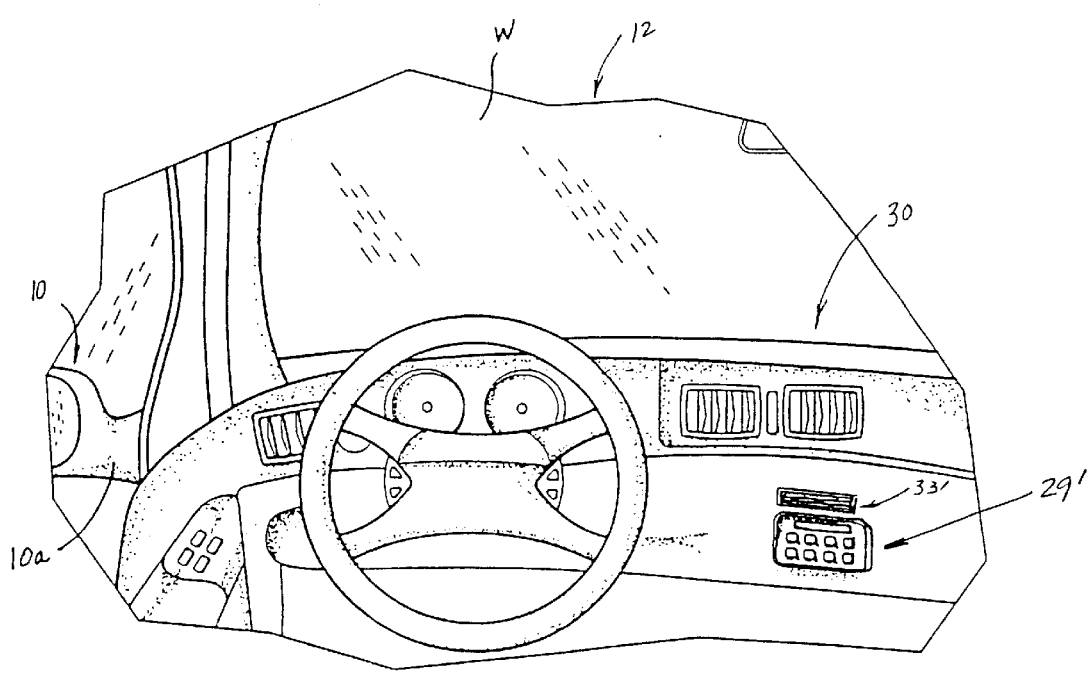
FIG. 4 is a front elevation of a dashboard instrument panel of the vehicle of FIG. 1 with an input device of the interface transaction system of the present invention mounted thereto.

Preferably, mounted inside vehicle 12 is a transceiver control or input device 29, which is accessible by an occupant of the vehicle. Input device 29 may comprise a key pad with alphanumeric or function keys or buttons 29a and a display are 29b. Preferably, key pad 29 is mounted in the cabin of the vehicle on, for example, dashboard 30 of the vehicle (FIG. 4). Optionally, key pad 29 may be removably mounted on a dashboard 30 so that the key pad 29 is accessible by any occupant in the vehicle. In addition, key pad 29 may include a card reader device 33 which reads the magnetic tape on a credit card or bank card or the like and permits the occupant of the vehicle to use either the credit card or bank card to pay for the transaction. Referring to FIG. 4, a separate key pad 29' and card reader device 33' may be provided. In this embodiment, key pad 29' and card reader device 33' are mounted in dashboard 30'.

As best seen in FIGS. 3 and 4, key pad 29 is electrically coupled to transceiver 28 by conventional wiring 28a which extends (along with other electrical cables or wiring for the other electrical components in rearview mirror assembly 10) from the interior cabin of vehicle 12 through the mirror mounting bracket 10a (FIG. 1) and through an opening 14b provided in housing 14. Key pad 29 generates signals based on the sequence of buttons or keys that are pressed by the occupant or based on the card reader device's reading of the credit or bank card. These signals which are preferably electrical, but which could also be radio, microwave, infrared or other signals, are then transmitted to transceiver 28 via the electrical wiring. The transceiver then modulates and transmits the signals to the remote bank teller unit or machine or a point-of-sales transaction system. For example, key pad 29 may be used to generate an electrical signal which includes the personal identification number (PIN) of the occupant of the vehicle so that the occupant of the vehicle can communicate with a bank teller and engage in a transaction with the bank teller or cash machine without rolling down the vehicle window. Preferably, the transmission or at least the signal transmitting the PIN or credit or debit card number is secure against electronic eves dropping. For example, transceiver 28 may transmit a rolling code, which can be generated by a processor, for example a computer or digital logic circuitry. In this manner, an initial PIN code is selected by the occupant of the vehicle, with the code being rolled for each subsequent transaction by the computer or digital logic circuitry to ensure that any potential electronic eves droppers will not have access to an effective code. Such rolling code techniques are conventional and are known in the communications art.

The interface transaction system may include a designated processor for generating the rolling code and for general processing purposes, or may, for example, include an onboard computer that is used to control other functions in the vehicle, such as control of the vehicle cabin environment, automatic headlight activation systems, electro optic mirror elements, blind spot detection systems, compass systems, intrusion detection systems, vehicle security lights and turn signal indicators, keyless entry systems, and trainable garage door opener systems, and the like. For details of several mounting arrangements and of other vehicle functions or systems, reference is made herein to pending U.S. patent application entitled "Modular Rearview Mirror Assembly Including an Electronic Control Module", Ser. No. 08/702,228 which was filed on Aug. 23, 1996, by Niall Lynam et al., now U.S. Pat. No. 6,019,475, and which is assigned to Donelly Corporation of Holland, Mich., the disclosure of which is incorporated by reference herein in its entirety.

Optionally, the interface system of the present invention may call for a dual code protocol when engaged in such transactions in which increased security is desirable, for example banking transactions. In one form, vehicle 12 may include a means for identifying the owner of the vehicle, such as a bar code. The bar code is scanned, for example, by the remote bank teller or cash unit or machine. In order to provide added measures of security, a remote bank teller or cash machine system may be programmed to only engage in any such transactions when the vehicle owner code matches up with the appropriate PIN code of the vehicle's owner.

Alternately, transmitter 28 may emit an initial signal code, which represents the identification of the vehicle and owner of the vehicle. However, such dual code systems will tend to limit the use of the interface system to the owners of the vehicle and only when the owners of the vehicle are in their respective vehicles. Optionally, at the discretion of the customer, an override code may be provided so that the customer may engage in such transactions in a rental car or in other vehicles which the customer does not own.

In such dual code systems, therefore, it should be understood that when a customer is an occupant of a vehicle which the customer owns, the remote bank teller machine protocol would require a first code (the vehicle owner code), associate it with the bank customer, and then wait for the appropriate personal identification number (PIN) of that particular bank customer before engaging in an transaction with the occupant of the vehicle. Where rolling code is utilized, the machine protocol will look for the most up-to-date PIN number before engaging in any such transaction. Where a bank customer is an occupant of a vehicle that he or she does not own, such as a rental vehicle or a borrowed vehicle, therefore, the bank teller machine protocol may not recognize the vehicle or may recognize the vehicle as another bank customer's vehicle and then wait for the PIN code for the owner for that vehicle. As mentioned above, optionally, the interface system may provide for an override code so that the bank customer can provide the override code to the remote bank teller or cash machine so that the machine's protocol will recognize the non-vehicle owner bank customers code. Where the vehicle identification code is transmitted by the transceiver 28, the transaction sequence is, therefore, initiated by the vehicle.

It should be understood that transceiver 28 may be located essentially anywhere in the vehicle, including for example exterior rearview mirror assembly 10 as described above or a passenger side exterior rearview mirror assembly 10' shown in FIG. 1. Reference is made to driver side exterior rearview mirror assembly 10 for the details of passenger side exterior rearview mirror assembly 10'. In addition, transceiver 28 may be mounted in an interior rearview mirror assembly, as will be more fully described below.

Figure 5:
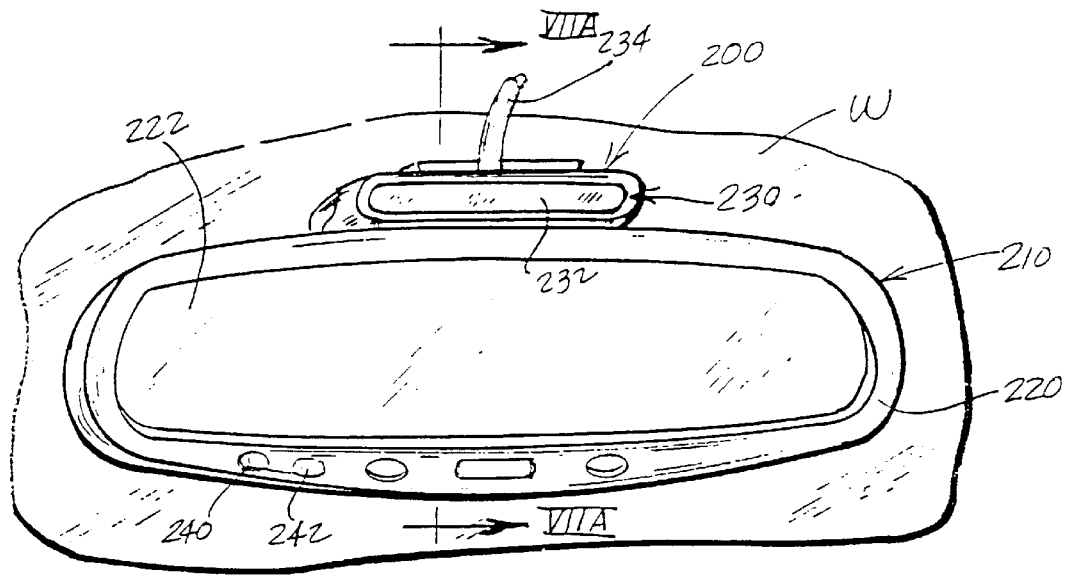
FIG. 5 is a front perspective view of an interior rearview mirror assembly and mirror assembly support with the interface system of the present invention mounted therein.
Figure 6:
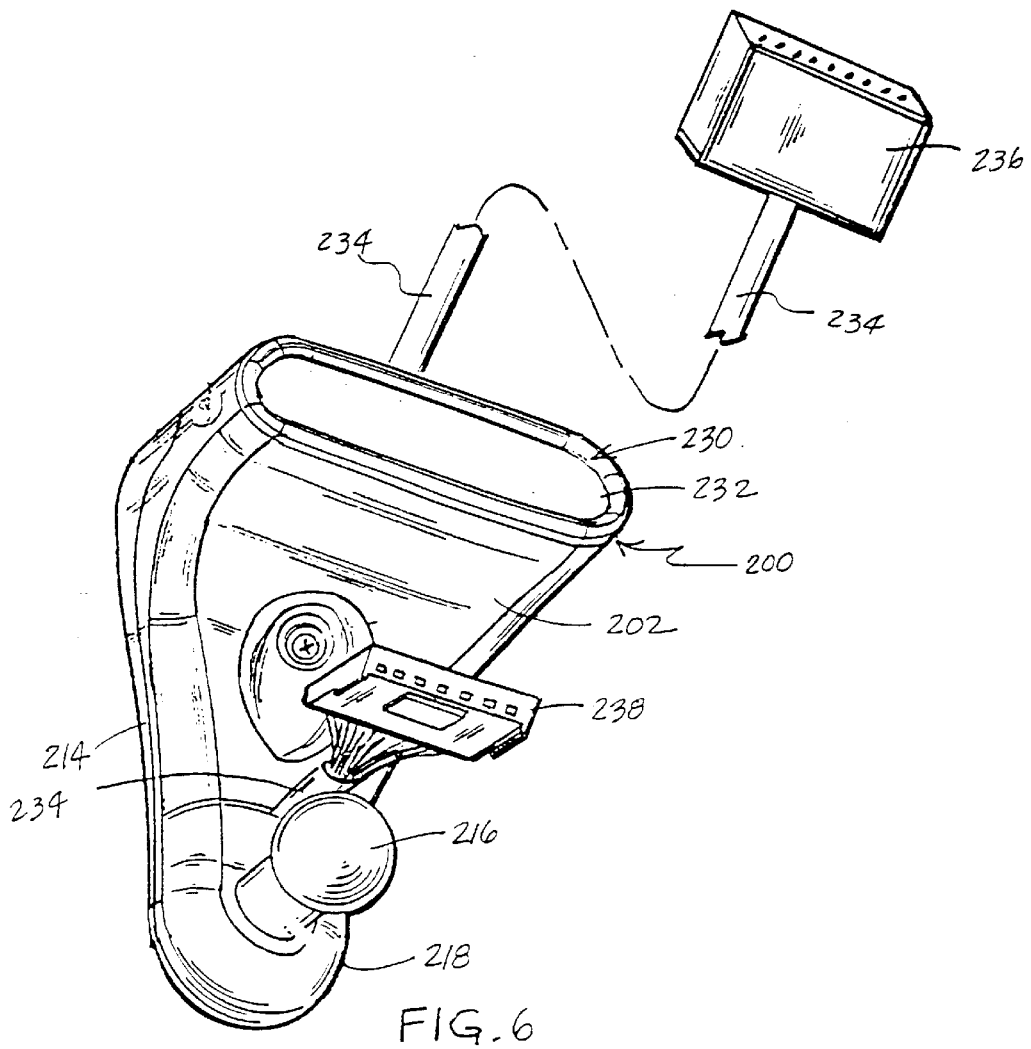
FIG. 6 is a perspective view of the mirror assembly support of FIG. 5.
Figure 7A:
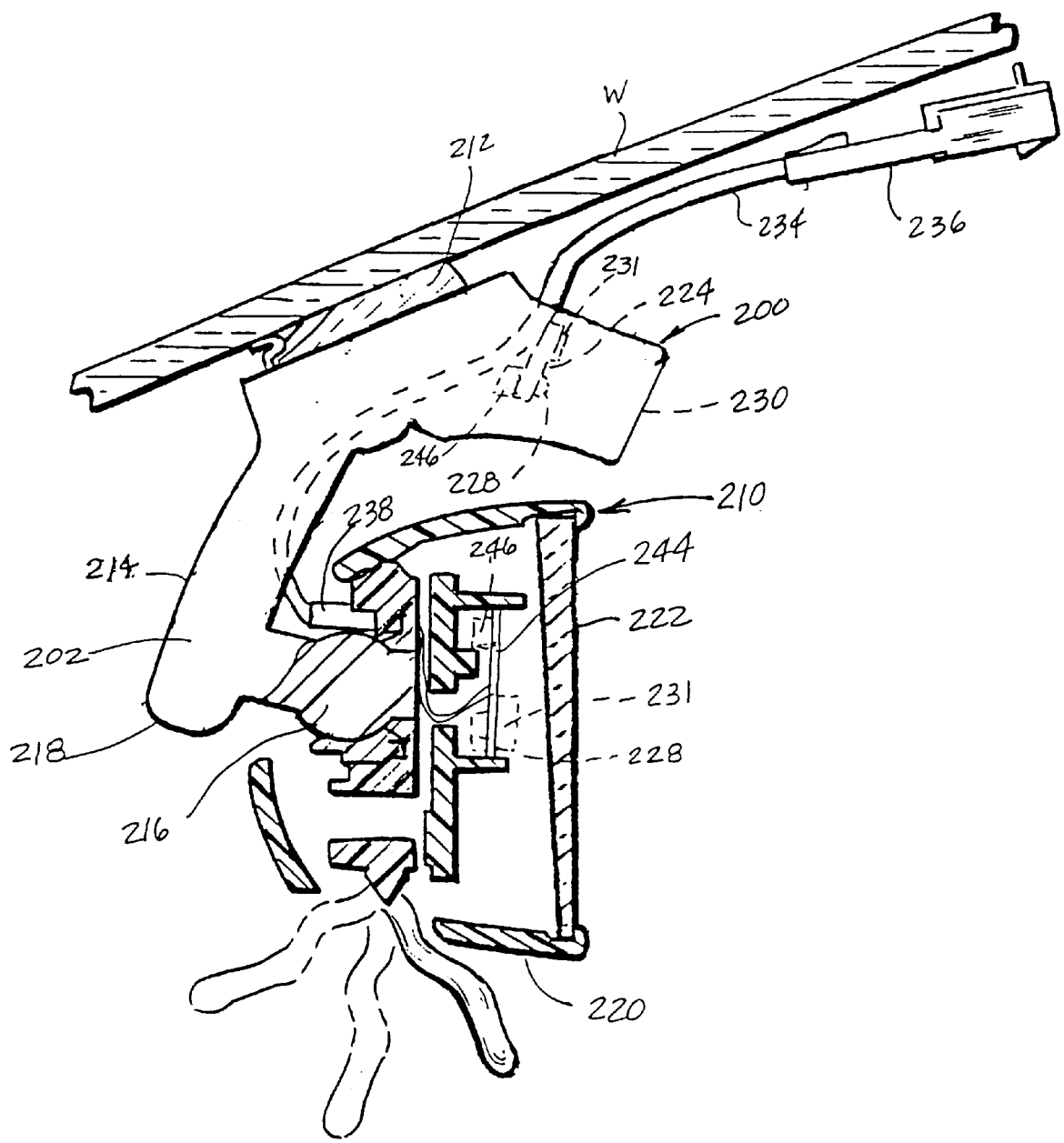
FIG. 7A is a cross-sectional view taken along line VIIA—VIIA of FIG. 5.

Referring to FIG. 5, an interior rearview mirror 210 is shown mounted to a mirror assembly support 200, which in turn is mounted to windshield of vehicle 12. Rearview mirror support assembly 200 is mounted to windshield W using a mounting button assembly 212 (FIG. 7A), which allows support 200 to break away from windshield W upon impact. Reference is made to pending U.S. patent application entitled "Rearview Mirror Support Incorporating Vehicle Information Display" filed by Jonathan E. DeLine and Niall R. Lynam on Feb. 18, 1998, which is assigned to Donnelly Corporation. As best seen in FIGS. 6 and 7A, support 200 comprises a unitary rearview mirror support and includes a housing 202, which defines a base 214, and an outwardly extending mirror support ball pivot member 216 which is provided at a lower end 218 of base 214. Rearview mirror assembly 210 includes a housing 220 which is preferably contoured to match the side profile of support 200 and is mounted on pivot member 216 to provide multi axis positioning of housing 220 about support 200.

As best seen in FIG. 7A, rearview mirror assembly 210 includes a prismatic reflective element 222 which is housed in mirror housing 220. Alternately, reflective element 222 may comprise any one of the reflective elements described in reference to the first embodiment. Preferably, however, rearview mirror assembly 210 comprise a manually-operated, prismatic day/night mirror assembly, such as the type described in U.S. Pat. No. 4,948,242. Optionally, rearview mirror assembly 210 may comprise an electrically-operated, compass mirror assembly such as that described in U.S. Pat. No. 5,253,109, or an electrically-operated interior rearview mirror assembly incorporating map/reading lights such as those described in U.S. Pat. Nos. 4,646,210; 4,733,336; 4,807,096; 5,178,448; 5,669,698; 5,671,996; and copending, commonly assigned U.S. patent application Ser. No. 08/918,772, filed Aug. 25, 1997, to DeLine et al., now U.S. Pat. No. 6,124,886; an electrically-operated, automatically dimming mirror assembly such as those described in U.S. Pat. Nos. 4,793,690; 4,799,768; 4,886,960; and 5,193,029; and an electrically-operated memory interior rearview mirror assembly. The disclosures of each of the above listed U.S. patents and patent applications are hereby incorporated by reference herein in its entireties. Optionally, this invention may be used in conjunction with electrically-operated interior rearview mirrors integrally incorporating other systems or features such as antennas, map lights, automatic dimming circuitry, microphones, loudspeakers, etc., as such features may be accommodated in the limited space available within the mirror case cavity.

Mounted in support 200 is a carrier member 224, such as a circuit board. Carrier member 224 is supported by housing 202 and includes a transceiver 228 of an interface transaction system of the present invention mounted thereto. Transceiver 28 is of a similar type described in reference to the first embodiment. Alternately, transceiver 228 (shown in phantom) may be mounted in interior rearview mirror assembly 210 on a similar carrier member or circuit board 244 (FIG. 7A). Optionally, carrier member 224 may also include a plurality of other electrical and/or electronic components for other vehicle or mirror systems, for example, a blind spot detection system, such as disclosed in U.S. patent application Ser. No. 08/799,734, entitled "Vehicle Blind Spot Detection and Display System" invented by Schofield et al., and filed Feb. 12, 1997, now U.S. Pat. No. 5,786,772, a windshield moisture sensor system, such as described in U.S. Pat. No. 4,973,844, entitled "Vehicular Moisture Sensor and Mounting Apparatus Therefore", the disclosures of which are incorporated herein by reference, electrochromic dimming circuitry for a variable reflectance electrochromic mirror element, a rain sensor control circuitry, a remote keyless entry receiver system, a cellular phone system, and the like. As described in reference to the previous embodiment, transceiver 228 provides an interface system to enable an occupant of the vehicle to communicate with a remote bank teller machine or a point-of-sale transaction system.

Referring to FIG. 6, support 200 includes a display area 230 having a display element 232, similar to the information display unit described in pending U.S. pending application entitled "Rearview Mirror Support Incorporating Vehicle Information Display". Display element 232 preferably comprises a multi-pixel display and, most, preferably a scrolling display which provides menu options, with the scrolling of the display being controlled by buttons 240 and/or 242, which may be mounted to housing 220 of rearview mirror assembly 210. Optionally, display area 230 may include a touch activated screen which displays a plurality of options. The electrical circuitry 231 for operating display area 230 may be mounted to carrier member 224 in support housing 200. Optionally, electrical circuitry 231 for controlling display element 232 may be positioned on a circuit board 244 mounted in rearview mirror assembly 210 behind reflective element 222. As best seen in FIG. 5, mirror support 200 includes an electrical harness 234, which electrically couples the various electronic or electrical devices in mirror support 200 and/or rearview mirror assembly 210 to the vehicle electrical system via an electrical connector 236. Coupler 236 eases installation and removal of support 200. Similarly, harness 234 exits support 200 for coupling to the respective electronic or electrical components in rearview mirror assembly 210 via a connector 238 so that mirror assembly 210 can be disconnected from support 200 for repair or replacement. Included in harness 234 is the electrical wiring for display area 230 which electrically couples the display area 230 to its associated circuitry, which is preferably mounted on carrier 224, and the electrical wiring for transceiver 228, which electrically couples transceiver 228 to display area 230, as will be more fully explained below.

In preferred form, display area 230 displays a menu of options for the occupant of the vehicle to enable the occupant to engage in a transaction while the occupant is seated in the vehicle. Display area 230 may be electrically coupled to transceiver 228 via a processor 246, for example a microprocessor or a digital logic circuitry and optionally a memory device, which may be located in support 200 or may be mounted in rearview mirror assembly 210, for example, on a similar carrier member. In this embodiment, the menu is driven by one or more buttons 240, 242 which are mounted to housing 220 of interior rearview mirror assembly 210 preferably along the lower perimeter of housing 220 or along a bezel. Additionally, buttons 240 and/or 242 permit the occupant to input their PIN or credit card information, either through menu driven selections or other alpha numeric buttons which may be provided. Therefore, signals transmitted by transceiver 228 may be controlled by the use of buttons 240 and/or 242 which select a transaction, the information delineating the transaction being stored in processor 246 or, for example in a memory device. The occupant, using buttons 240 and/or 242, inputs the required PIN number or credit card information. Optionally, display area 230 may be driven by a remote control or input device, such as the key pad described in reference to the first embodiment.

In operation, the occupant of the vehicle may initialize a transaction sequence, for example, by pressing button 240 or 242 which actuates display area 230 to display a menu. The occupant then selects from the menu the type of transaction desired with button 240 and/or button 242. After selecting the type of transaction, the occupant of the vehicle then provides the appropriate identification number, whether it is the personal identification number (PIN) or a credit card number in combination with a personal identification number.

Figure 7B:
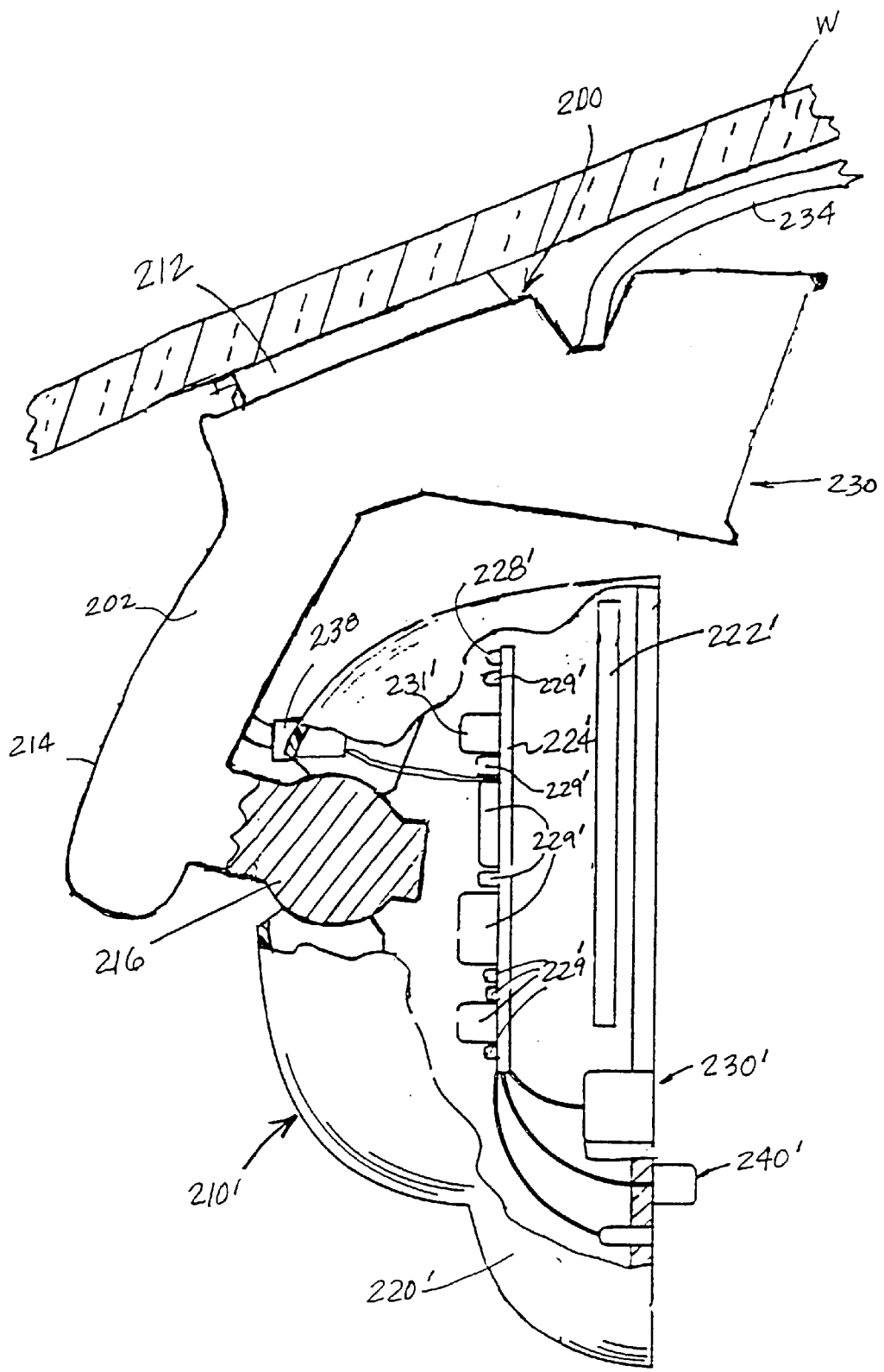
FIG. 7B is a partial fragmentary side elevation of a second embodiment of the interior rearview mirror assembly of FIG. 5.

Referring to FIG. 7B, a second embodiment 210' of an interior rearview mirror assembly is illustrated which is mounted to rearview mirror support assembly 200. Rearview mirror assembly 210' includes a reflective element 222' which is housed in mirror housing 220'. Reference is made to exterior rearview mirror assembly 10 and rearview mirror assembly 210 for details of reflective element 222'. Mounted in housing 220' behind reflective element 222' is a carrier member 224' such as a circuit board. Carrier member 224' includes a transceiver 228', for interfacing with a remote bank teller machine or a point-of-sales transaction system, and optionally a plurality of electrical and/or electronic components 229' for providing a multitude of optional features, as described in reference to the previous embodiment.

In this embodiment, a display area 230' for the interface transaction system is provided in interior rearview mirror assembly housing 220'. Display area 230' is preferably positioned below reflective element 222' and is driven by an electrical and/or electronic circuit 231' which is mounted to carrier 224'. Similar to the previous embodiment, interior rearview mirror assembly 210' includes at least one button 240', which is mounted to housing 220' below reflective element 222' and below display area 230', for selecting options which are displayed on display area 230'. Transceiver 228' is electrically coupled to display screen area 230' via carrier member 224' for transmitting the selected options and information input through button 240' to a remote bank teller or a point-of-sales transaction system or the like, as described in reference to the previous embodiments.

Figure 8:
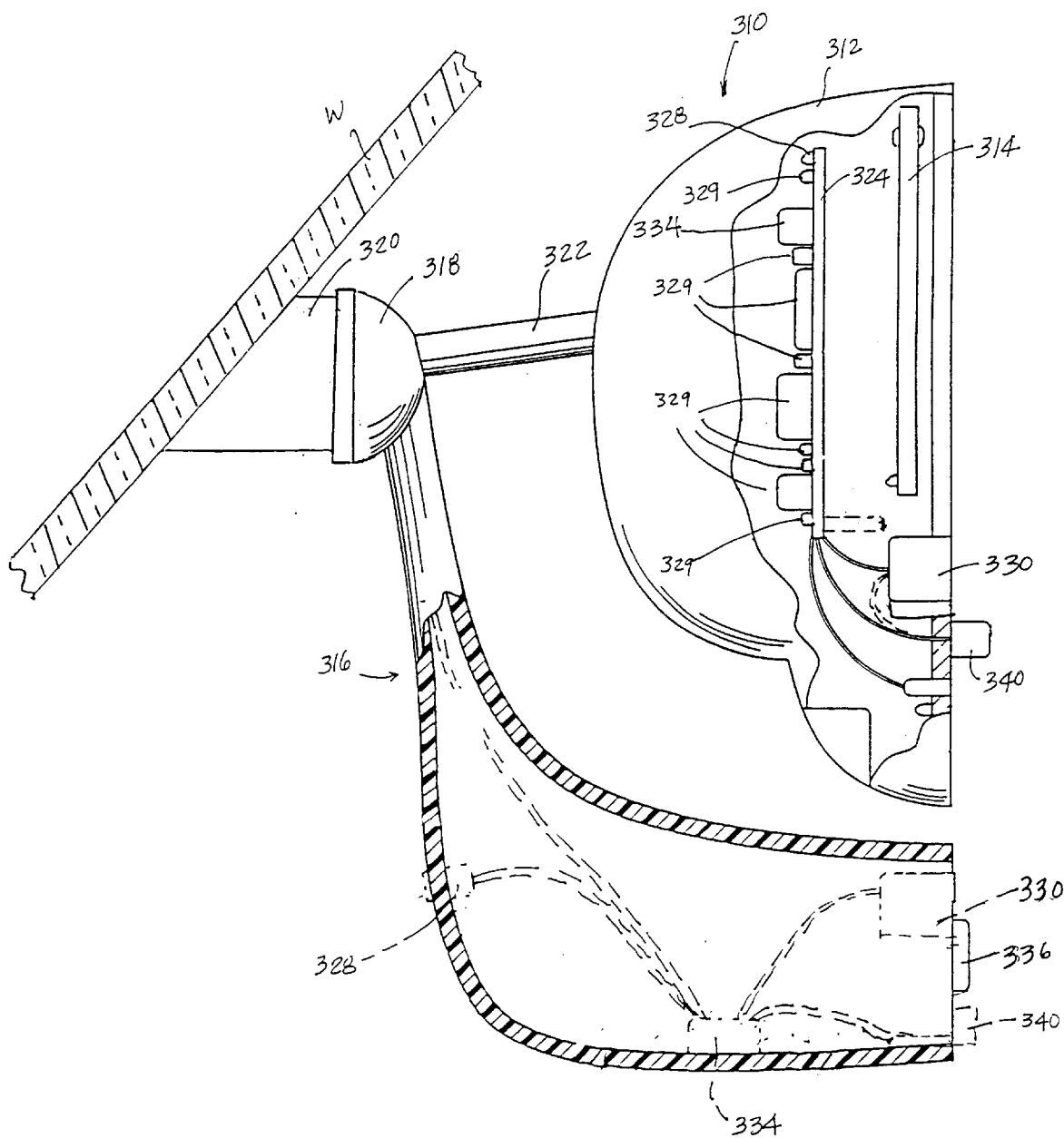
FIG. 8 is a third embodiment of an interior rearview mirror assembly with the interface transaction system of the present invention mounted therein.

Referring to FIG. 8, a third embodiment 310 of the interior rearview mirror assembly is illustrated. Interior rearview mirror assembly 310 includes a mirror housing 312, which supports a reflective element 314, and a pod 316. Mirror housing 312 and pod 316 are mounted to a mirror mount 318, which engages a window button 320 that is adhered to windshield W by conventional means, such as an adhesive. Mirror housing 312 preferably includes a support 322, including a fixed or removable support, for mounting mirror housing 312 to mirror mount 318. Support 322 may provide multi-axis positioning of housing 312 and, therefore, reflective element 314. For example, support 322 may include dual ball joints, one positioned at the support's connection to mirror mount 318 and the other positioned at the support's connection to housing 312, as would be understood by those having ordinary skill in the art.

Included in mirror housing 312, is a carrier member 324 on which a transmitter 328 of an interface system of the present invention and, optionally, one or more of a plurality of electrical and/or electronic components 329 are mounted, including, for example blind spot detection systems, rain sensor systems, and the like, as described in reference to the first embodiment. In the illustrated embodiment display area 330 is mounted to housing 312. Alternately, as shown in phantom, display area 330 may be mounted to pod 316. Display 330 may perform a single display function for the interface system of the present invention or may provide multiple display functions such as described in U.S. patent pending application entitled MODULAR REARVIEW MIRROR ASSEMBLY, Ser. No. 08/918,772, filed on Aug. 25, 1997, by Jonathan E. Deline, Roger L. Veldman, and Niall R. Lynam, now U.S. Pat. No. 6,124,886, the disclosure of which is incorporated herein by reference in its entirety. Preferably, display 330 comprises a multi-pixel display which provides a menu of options that are driven by one or more input devices, for example a button 340 which may also be mounted to a lower portion of housing 312. Preferably, display 330 and button 340 are positioned below reflective element 314 to enable the driver of the vehicle to observe the display without causing the driver of the vehicle to shift his or her attention away from the rearview mirror. Preferably mounted to carrier member 324, is a transceiver 328 of the type described in reference to the first embodiment which is electrically coupled to display 330 and input device 340 via carrier member 324. Transceiver 328 transmits signals which are generated by input device 340 and optionally by display 330. In this manner, the occupant of the vehicle may select a transaction using input device 340 and transmit a desired transaction via transceiver 328 to a remote bank teller of a point-of-sales transaction system, as described in reference to the first embodiment. Display device 330 is driven by an electrical or electronic circuit 334 which may be mounted to carrier member 324. Preferably, electrical and/or electronic circuit 334 includes a processor and a memory device, which stores, for example the personal identification number (PIN) and/or a rolling code program so that when the occupant of the vehicle engages in a transaction the occupant can be assured that his or her PIN cannot be surreptitiously acquired for later unauthorized use.

Optionally, display 330 may be mounted in pod 316 below housing 312 (as shown in phantom), with pod 316 housing associated electrical and/or electronic circuitry 334 associated with display 330. Moreover, pod 316 provides a larger mounting surface should a plurality of displays and/or buttons or keys be desired. In addition, pod 316 may house a card reader 336 which permits the occupant of the vehicle to insert a credit or band card for payment of a transaction.

As mentioned in reference to the earlier embodiments, display 330 may optionally be driven by a remote control or input device, such as the key pad disclosed in reference to the first embodiment. In this manner, the size of the input device may be increased as desired to accommodate a plurality of buttons, toggles, or touch pads and also may be removably mounted to dashboard 30 of vehicle 12 so that anyone of the occupants of the vehicle may engage in such a transaction.

Referring to FIGS. 9–11, a fourth embodiment 410 of an interior rearview mirror is illustrated. Rearview mirror assembly 410 includes a reflective mirror element 412 and a mirror housing 414, which supports reflective element 412 therein. In this embodiment, reflective mirror element 412 is mounted on housing 414 which, in turn, is pivotally mounted in conventionally known manner to a manual actuator 416 which permits housing 414 and reflective mirror element 412 to be shifted between day and night viewing positions. Manual actuator 416 includes a mounting base 418 and a mounting arm 420 which extends from mounting base 418 and through an aperture 422 of housing 414 for mounting mirror assembly 410 to vehicle windshield W. Mounting base 418 is pivotally mounted to housing 414 on axles 419 while pivot tab 421, which is integrally joined to spring bar 419a on base 418, is pivotally mounted to housing 414 below base 418 on axle 421a. Housing 414 and reflective element 412 are thus pivoted between day and night positions via pivot tab 421 which moves base 418 and spring bar 419a in over-center action. Manual actuator 416 is conventional and may comprise a manual flip mirror of the same general type disclosed in U.S. Pat. No. 5,521,760 issued to De Young et al. for "An Energy Absorbing Rearview Mirror Assembly" and in the U.S. Pat. No. 5,327,288 issued to Willington et al. for "A Reduced Vibration Day/Night Rearview Mirror Assembly", the disclosure of which are hereby incorporated herein by reference in their entireties.

As best seen in FIG. 11, mounting base 418 includes a cavity 423 in which a circuit board or carrier member 424 is mounted by conventional means, including for example fasteners 424a. Circuit board 424 is electrically coupled to the electrical system of the vehicle through a connector 426 which is mounted on a rearward facing surface 424b of circuit board 424. Connector 426 is adapted to receive a mating connector 429 of a wire bundle 430 which is electrically coupled to the electrical system of the vehicle. Again referring to FIG. 11, mounting base 418 includes a transverse opening 432 which is generally aligned with a corresponding opening 434 in housing 414 and which permits coupler 429 to extend through housing 414 and mounting base 418 to electrically couple to connector 426 of carrier or circuit transaction member 424.

Similar to the previous embodiments, a transceiver 428 of an interface system of the present invention is mounted to carrier member 424 and electrically coupled via connector 426 to the electrical system of the vehicle. As described in reference to the previous embodiments, transceiver 428 sends signals to a remote receiver, including, for example a remote bank teller or point-of-sales transaction system. In this embodiment, the interface transaction system includes a remote input device, such as a keypad as described in reference to the first embodiment, which is electrically coupled to transceiver 428 via a wire bundle 430. It should be understood, that carrier member 424 may include one or more of a plurality of other electrical or electronic devices 429a, as described in reference to the previous embodiments. For example, carrier member 424 may include a global positioning system navigational aid or the like, in which case, carrier member may 424 include a global positioning system antenna and receiver which is responsive to signals generated from a global positioning system satellite which is known in the art.

It can be appreciated from the foregoing that the interface transaction system of the present invention may be used in combination with one or more of the plurality of electronic or electrical systems that are desirable in a rearview mirror assembly. The interface transaction system preferably includes a transceiver, which transmits and receives; however, in some applications, the interface transaction system may include just a transmitter which is manually prompted by the occupant of the vehicle in response to signals, for example visual signals, from the remote receiver. Moreover, the interface transaction system may be configured for a dual-code type of protocol, as described in reference to the first embodiment, or configured for a single-code type protocol which would provide universal application.

While are several forms of the invention have been shown and described, other forms will now become apparent to those skilled in the art. For example, a transceiver and input device may be combined in a single modular unit which may be mounted to the dashboard of the vehicle. Likewise, the transceiver and the input device may be commonly mounted as a module or unitary pod, which is insertable in the housing of a rearview mirror assembly or mirror assembly support or pod. In such an application, the unitary pod may be mounted in a fixed position in the housing of the rearview mirror assembly or may be positionable between a stored position in which the unitary pod is enclosed in the housing and an extended position in which the pod is projected from the housing to provide access to the input device. Furthermore, in reference to the component parts of the interface transaction system being "mounted on", the term "on" is used in its broadest sense and should be understood to include on, in, and at. Therefore, it will be understood that the embodiments shown in the drawing and described above are merely for illustrative purposes only, and are not intended to limit the scope of the invention which is defined by the claims which follows.

We claim:

1. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly having an interior rearview mirror housing and an interior rearview mirror reflective element housed in said interior rearview mirror housing, said interior rearview mirror housing pivotally positionable about an interior rearview mirror support, said interior rearview mirror support attaching to said interior portion of said vehicle by a mirror circuit;

a transceiver provided at said interior rearview mirror assembly;

said transceiver provided at said interior rearview mirror assembly including a transmitter for sending at least one communication signal from said vehicle to a remote transaction unit for communication with the remote transaction unit, the remote transaction unit being located exteriorly of the vehicle in which said interior rearview mirror assembly is installed and the remote transaction unit being operable both to receive communication from said transceiver provided at said interior rearview mirror assembly and to send communication to said transceiver provided at said interior rearview mirror assembly;

said transceiver provided at said interior rearview mirror assembly including a receiver for receiving at least one signal from the remote transaction unit that is located exteriorly of the vehicle;

an input device provided at said interior rearview mirror assembly in communication with said transceiver and accessible by the occupant during normal use of the vehicle, said input device comprising at least one of an alphanumeric key pad, a touch activated screen, and a card reader, and said input device generating at least one input device signal, and said at least one communication signal comprising said input device signal;

said transmitter sending said at least one input device signal from the vehicle to the remote transaction unit located exteriorly of the vehicle; and said input device enabling the occupant of the vehicle to at least one of authorize payment and make payment for the remote transaction.

2. The vehicular rearview mirror system according to claim 1, wherein a display is provided at said interior rearview mirror assembly.

3. The vehicular rearview mirror system according to claim 2, wherein said display displays information relating to said remote transaction.

4. The vehicular rearview mirror system according to claim 2, wherein said display displays a menu, said menu including selections for said remote transaction.

5. The vehicle mounted remote transaction interface system according to claim 4, wherein said menu is driven by at least one button, said button being mounted at said interior rearview mirror assembly.

6. The vehicle mounted remote transaction interface system according to claim 4, wherein said display comprises said touch activated screen.

7. The vehicle mounted remote transaction interface system according to claim 5, wherein said button is provided at one of said interior rearview mirror housing, said interior rearview mirror support, and said mirror mount.

8. The vehicle mounted remote transaction interface system according to claim 2, wherein said display is mounted at said interior rearview mirror support.

9. The vehicle mounted remote transaction interface system according to claim 8, wherein said display displays a menu, said menu including selections relating to the remote transaction.

10. The vehicle mounted remote transaction interface system according to claim 9, wherein said menu is driven by at least one button, said button being mounted at said interior rearview mirror assembly.

11. The vehicle mounted remote transaction interface system according to claim 1, wherein at least one of said signals comprises a secure signal, said secure signal being secure from electronic eavesdropping.

12. The vehicle mounted remote transaction interface system according to claim 1, wherein said input device is provided at one of said interior rearview mirror housing, said interior rearview mirror support, and said mirror mount.

13. The vehicle mounted remote transaction interface system according to claim 1, wherein said input device comprises an alphanumeric key pad and said alphanumeric key pad is provided at one of said interior rearview mirror housing, said interior rearview mirror support, and said mirror mount.

14. The vehicle mounted remote transaction interface system according to claim 1, wherein said input device comprises a card reader and said card reader is provided at one of said interior rearview mirror housing, said interior rearview mirror support, and said mirror mount.

15. The vehicle mounted remote transaction interface system according to claim 14, wherein said card reader comprises a credit card reader.

16. The vehicle mounted remote transaction interface system according to claim 14, wherein said card reader comprises a bank card reader.

17. The vehicle mounted remote transaction interface system according to claim 1, wherein said input device comprises a touch activated screen and said touch activated screen is provided at one of said interior rearview mirror housing, said interior rearview mirror support, and said mirror mount.

18. The vehicular rearview mirror system according to claim 1, wherein said transmitter comprises a radio frequency transmitter.

19. The vehicular rearview mirror system according to claim 1, wherein said transmitter comprises an infrared transmitter.

20. The vehicular rearview mirror system according to claim 1, wherein said input device includes a plurality of alphanumeric buttons for generating a signal which includes at least one of a personal identification number and a credit card number of the occupant of the vehicle.

21. The vehicular rearview mirror system according to claim 1, said card reader being adapted to read a magnetic strip.

22. The vehicular rearview mirror system according to claim 1, wherein said input device comprises a touch activated screen.

23. The vehicular rearview mirror system according to claim 1, wherein said input device comprises a card reader.

24. The vehicular rearview mirror system according to claim 1, wherein said input device comprises an alphanumeric key pad.

25. The vehicle mounted remote transaction interface system according to claim 1, wherein said interface system includes a first code transmitted by said vehicle mounted remote transaction interface system and a second code transmitted by said vehicle mounted remote transaction interface system, one of said first and second codes associated with an identity of a customer, the other of said first and second codes comprising a personal identification number, and the remote transaction unit engaging in said transaction only when said first code corresponds with said second code.

26. The vehicle mounted remote transaction interface system according to claim 1, wherein said input device is provided at one of said interior rearview mirror housing and said interior rearview mirror support.

27. The vehicle mounted remote transaction interface system according to claim 1 further comprising a pod, said pod mounted at said mirror mount, said pod including said input device.

28. The vehicle mounted remote transaction interface system according to claim 27, wherein said pod includes a card reader coupled to said transceiver.

29. The vehicular rearview mirror system according to claim 1, wherein said input device is at said interior rearview mirror housing.

30. The vehicular rearview mirror system according to claim 1, wherein said interior rearview mirror assembly includes at least one of an antenna, a map light, an automatic dimming circuitry, a microphone, a loudspeaker, a prismatic reflective element, an electrochromic reflective element, a windshield moisture sensor, a rain sensor control circuitry, a remote keyless entry system, a navigational aid, and a cellular phone system.

31. The vehicular rearview mirror system according to claim 30, wherein said antenna comprises a global positioning system antenna.

32. The vehicular rearview mirror system according to claim 30, wherein said navigational aid comprises a global positioning system.

33. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly including an interior rearview mirror housing and an interior rearview mirror reflective element housed in said interior rearview mirror housing, said interior rearview mirror assembly further including an interior rearview mirror support and a mirror mount, said interior rearview mirror housing pivotally positionable about said interior rearview mirror support, said interior rearview mirror support attaching to said interior portion of said vehicle by said mirror mount;

a transceiver provided at said interior rearview mirror assembly, said transceiver comprising a controller;

said transceiver provided at said interior rearview mirror assembly including a transmitter for sending at least one communication signal from said vehicle to a remote transaction unit for communication with the remote transaction unit, the remote transaction unit being located exteriorly of the vehicle in which the interior rearview mirror assembly is installed and the remote transaction unit being operable both to receive communication from said transceiver provided at said interior rearview mirror assembly and to send communication to said transceiver provided at said interior rearview mirror assembly;

said transceiver provided at said interior rearview mirror assembly including a receiver for receiving at least one signal from the remote transaction unit;

an input device provided at said interior rearview mirror assembly in communication with said transceiver and accessible by the occupant during normal use of the vehicle, said input device comprising at least one of an alphanumeric key pad, a touch activated screen, and a card reader, and said input device generating at least one input device signal, and said at least one communication signal comprising said input device signal, and said transmitter sending said at least one input device signal from the vehicle to the remote transaction unit located exteriorly of the vehicle;

said controller controlling at least one function chosen from (i) a vehicle cabin environment function, (ii) an automatic headlight activation system function, (iii) an electro-optic mirror element function, (iv) a blind spot detection system function, (v) a compass system function, (vi) an intrusion detection system function, (vii) a vehicle security light function, (viii) a turn signal indicator function, (ix) a keyless entry system function, and (x) a trainable garage door opener system function;

wherein at least one of said transceiver and said input device is included at least one of said mirror housing, said mirror support, and said mirror mount; and said input device enabling the occupant of the vehicle to at least one of authorize payment and make payment for the remote transaction.

34. The vehicular rearview mirror system according to claim 33, wherein a display is provided at said interior rearview mirror assembly.

35. The vehicular rearview mirror system according to claim 34, wherein said display displays information relating to said remote transaction.

36. The vehicular rearview mirror system according to claim 35, wherein said display displays a menu, said menu including selections for said remote transaction.

37. The vehicle mounted remote transaction interface system according to claim 36, wherein said menu is driven by at least one button, said button being mounted at said interior rearview mirror assembly.

38. The vehicle mounted remote transaction interface system according to claim 37, wherein said button is provided at one of said interior rearview mirror housing, said interior rearview mirror support, and said mirror mount.

39. The vehicle mounted remote transaction interface system according to claim 35, wherein said display comprises said touch activated screen.

40. The vehicle mounted remote transaction interface system according to claim 39, wherein said display is mounted at said interior rearview mirror support.

41. The vehicle mounted remote transaction interface system according to claim 35, wherein said display is mounted at said interior rearview mirror housing.

42. The vehicle mounted remote transaction interface system according to claim 35, wherein said menu is driven by at least one button, said button being mounted at said interior rearview mirror assembly.

43. The vehicle mounted remote transaction interface system according to claim 33, wherein said at least one communication signal comprises a secure signal, said secure signal being secure from electronic eavesdropping.

44. The vehicle mounted remote transaction interface system according to claim 33, wherein said input device is provided at one of said interior rearview mirror housing, said interior rearview mirror support, and said mirror mount.

45. The vehicle mounted remote transaction interface system according to claim 33, wherein said input device comprises an alphanumeric key pad and said alphanumeric key pad is provided at one of said interior rearview mirror housing, said interior rearview mirror support, and said mirror mount.

46. The vehicle mounted remote transaction interface system according to claim 33, wherein said input device comprises a card reader and said card reader is provided at one of said interior rearview mirror housing, said interior rearview mirror support, and said mirror mount.

47. The vehicle mounted remote transaction interface system according to claim 46, wherein said card reader comprises a credit card reader.

48. The vehicle mounted remote transaction interface system according to claim 46, wherein said card reader comprises a bank card reader.

49. The vehicle mounted remote transaction interface system according to claim 33, wherein said input device comprises a touch activated screen and said touch activated screen is provided at one of said interior rearview mirror housing, said interior rearview mirror support, and said mirror mount.

50. The vehicular rearview mirror system according to claim 33, wherein said transmitter comprises a radio frequency transmitter.

51. The vehicular rearview mirror system according to claim 33, wherein said transmitter comprises an infrared transmitter.

52. The vehicular rearview mirror system according to claim 33, wherein said input device includes a plurality of alphanumeric buttons for generating a signal which includes at least one of a personal identification number and a credit card number of the occupant of the vehicle.

53. The vehicular rearview mirror system according to claim 33, said card reader being adapted to read a magnetic strip.

54. The vehicular rearview mirror system according to claim 33, wherein said input device comprises a touch activated screen.

55. The vehicular rearview mirror system according to claim 33, wherein said input device comprises a card reader.

56. The vehicular rearview mirror system according to claim 33, wherein said input device comprises an alphanumeric key pad.

57. The vehicle mounted remote transaction interface system according to claim 33, wherein said vehicle mounted remote transaction interface system includes a first code transmitted by said vehicle mounted remote transaction interface system and a second code transmitted by said vehicle mounted remote transaction interface system, one of said first and second codes associated with an identity of a customer, the other of said first and second codes comprising a personal identification number, and the remote transaction unit engaging in said transaction only when said first code corresponds with said second code.

58. The vehicle mounted remote transaction interface system according to claim 33, wherein said input device is provided at one of said interior rearview mirror housing and said interior rearview mirror support.

59. The vehicle mounted remote transaction interface system according to claim 33 further comprising a pod, said pod being mounted at said mirror mount, and said pod including said input device.

60. The vehicle mounted remote transaction interface system according to claim 59, wherein said pod includes a card reader coupled to said transceiver.

61. The vehicular rearview mirror system according to claim 33, wherein said input device is at said interior rearview mirror housing.

62. The vehicular rearview mirror system according to claim 33, wherein said interior rearview mirror assembly includes at least one of an antenna, a map light, an automatic dimming circuitry, a microphone, a loudspeaker, a prismatic reflective element, an electrochromic reflective element, a windshield moisture sensor, a rain sensor control circuitry, a remote keyless entry system, a navigational aid, and a cellular phone system.

63. The vehicular rearview mirror system according to claim 62, wherein said antenna comprises a global positioning system antenna.

64. The vehicular rearview mirror system according to claim 62, wherein said navigational aid comprises a global positioning system.

65. The vehicular rearview mirror system according to claim 33, wherein said transceiver and said input device are commonly housed in a module.

66. The vehicular rearview mirror system according to claim 65, wherein said module is included at one of said mirror housing, said mirror support, and said mirror mount.

67. The vehicular rearview mirror system according to claim 65, wherein said module is included at said mirror mount.

68. The vehicular rearview mirror system according to claim 67, wherein said module is included in a pod attaching to said mirror mount.

69. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly having an interior rearview mirror housing and an interior rearview mirror reflective element housed in said interior rearview mirror housing, said interior rearview mirror housing pivotally positionable about an interior rearview mirror support, said interior rearview mirror support attaching to said interior portion of said vehicle by a mirror mount;

a transceiver provided at said interior rearview mirror assembly;

said transceiver provided at said interior rearview mirror assembly including a transmitter for sending at least one communication signal from said vehicle to a remote transaction unit for communicating with the remote transaction unit, the remote transaction unit being located exteriorly of the vehicle and the remote transaction unit being operable both to receive communication from said transceiver provided at said interior rearview mirror assembly and to send communication to said transceiver provided at said interior rearview mirror assembly;

said transceiver provided at said interior rearview mirror assembly including a receiver for receiving at least one signal from the remote transaction unit that is located exteriorly of the vehicle;

an input device generating at least one input device signal and being accessible by an occupant of the vehicle during normal use of the vehicle, and said at least one communication signal comprising said input device signal, and said transmitter sending said at least one input device signal from the vehicle to the remote transaction unit located exteriorly of the vehicle;

a display provided at said interior rearview mirror assembly, wherein said display displays information relating to said remote transaction; and said input device enabling the occupant of the vehicle to at least one of authorize payment and make payment for the remote transaction.

70. The vehicular rearview mirror system according to claim 69, wherein said input device is provided at said interior mirror assembly and in communication with said transceiver and accessible by the occupant; said input device comprising at least one of an alphanumeric key pad, a touch activated screen, and a card reader.

71. The vehicle mounted remote transaction interface system according to claim 70, wherein said input device comprises an alphanumeric key pad and said alphanumeric key pad is provided at one of said interior rearview mirror housing, said interior rearview mirror support, and said mirror mount.

72. The vehicle mounted remote transaction interface system according to claim 70, wherein said input device comprises a card reader and said card reader is provided at one of said interior rearview mirror housing, said interior rearview mirror support, and said mirror mount.

73. The vehicle mounted remote transaction interface system according to claim 72, wherein said card reader comprises a credit card reader.

74. The vehicle mounted remote transaction interface system according to claim 72, wherein said card reader comprises a bank card reader.

75. The vehicle mounted remote transaction interface system according to claim 70, wherein said input device comprises a touch activated screen and said touch activated screen is provided at one of said interior rearview mirror housing, said interior rearview mirror support, and said mirror mount.

76. The vehicular rearview mirror system according to claim 70, wherein said input device includes a plurality of alphanumeric buttons for generating a signal which includes at least one of a personal identification number and a credit card number of the occupant of the vehicle.

77. The vehicular rearview mirror system according to claim 70, said card reader being adapted to read a magnetic strip.

78. The vehicular rearview mirror system according to claim 70, wherein said input device comprises a touch activated screen.

79. The vehicular rearview mirror system according to claim 70, wherein said input device comprises a card reader.

80. The vehicular rearview mirror system according to claim 70, wherein said input device comprises an alphanumeric key pad.

81. The vehicle mounted remote transaction interface system according to claim 70, wherein said input device is provided at one of said interior rearview mirror housing and said interior rearview mirror support.

82. The vehicle mounted remote transaction interface system according to claim 70 further comprising a pod, said pod being mounted at said mirror mount, and said pod including said input device.

83. The vehicle mounted remote transaction interface system according to claim 82, wherein said pod includes a card reader coupled to said transceiver.

84. The vehicular rearview mirror system according to claim 70, wherein said input device is at said interior rearview mirror housing.

85. The vehicular rearview mirror system according to claim 69, wherein said display displays a menu, said menu including selections for said remote transaction.

86. The vehicle mounted remote transaction interface system according to claim 85, wherein said menu is driven by at least one button, said button being mounted at said interior rearview mirror assembly.

87. The vehicle mounted remote transaction interface system according to claim 86, wherein said button is provided at one of said interior rearview mirror housing, said interior rearview mirror support, and said mirror mount.

88. The vehicle mounted remote transaction interface system according to claim 69, wherein said at least one communication signal comprises a secure signal, said secure signal being secure from electronic eavesdropping.

89. The vehicle mounted remote transaction interface system according to claim 69, wherein said display is provided at one of said interior rearview mirror housing, said interior rearview mirror support, and said mirror mount.

90. The vehicular rearview mirror system according to claim 69, wherein said transmitter comprises a radio frequency transmitter.

91. The vehicular rearview mirror system according to claim 69, wherein said transmitter comprises an infrared transmitter.

92. The vehicle mounted remote transaction interface system according to claim 69, wherein said interface system includes a first code transmitted by said interface system and a second code transmitted by said interface system, one of said first and second codes associated with an identity of a customer, the other of said first and second codes comprising a personal identification number, and the remote transaction unit engaging in said transaction only when said first code corresponds with said second code.

93. The vehicle mounted remote transaction interface system according to claim 69, wherein said display comprises a touch activated screen.

94. The vehicle mounted remote transaction interface system according to claim 69, wherein said display is mounted at said interior rearview mirror support.

95. The vehicle mounted remote transaction interface system according to claim 69, wherein said display displays a menu, said menu including selections relating to the remote transaction.

96. The vehicle mounted remote transaction interface system according to claim 95, wherein said menu is driven by at least one button, said button being mounted at said interior rearview mirror assembly.

97. The vehicular rearview mirror system according to claim 69, wherein said interior rearview mirror assembly includes at least one of an antenna, a map light, an automatic dimming circuitry, a microphone, a loudspeaker, a prismatic reflective element, an electrochromic reflective element, a windshield moisture sensor, a rain sensor control circuitry, a remote keyless entry system, a compass system, a navigational aid, and a cellular phone system.

98. The vehicular rearview mirror system according to claim 97, wherein said antenna comprises a global positioning system antenna.

99. The vehicular rearview mirror system according to claim 97, wherein said navigational aid comprises a global positioning system.

100. The vehicular rearview mirror system according to claim 69, wherein said display comprises a multi-pixel display.

101. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly having an interior rearview mirror housing and an interior rearview mirror reflective element housed in said interior rearview mirror housing, said interior rearview mirror housing pivotally positionable about an interior rearview mirror support, said interior rearview mirror support attaching to said interior portion of said vehicle by a mirror mount;

a transceiver provided at one of said interior rearview mirror housing, said interior rearview mirror support, and said mirror mount;

said transceiver provided at said interior rearview mirror assembly including a transmitter for sending at least one communication signal from an input device located at said interior rearview mirror assembly to a remote transaction unit for communication between the input device and the remote transaction unit, said input device being accessible by an occupant of the vehicle during normal use of the vehicle, and said input device comprising one of an alphanumeric key pad, a touch activated screen, and a card reader, and said input device generating at least one input signal;

the remote transaction unit being located exteriorly of the vehicle in which said interior rearview mirror assembly is mounted and the remote transaction unit being operable both to receive said at least one input signal from said transceiver provided at said interior rearview mirror assembly and to send at least one communication signal to said transceiver provided at said interior rearview mirror assembly;

said transceiver provided at said interior rearview mirror assembly further including a receiver for receiving said at least one communication signal from the remote transaction unit that is located exteriorly of the vehicle;

wherein said interior rearview mirror assembly includes at least one of an antenna, a map light, an automatic dimming circuitry, a microphone, a loudspeaker, a prismatic reflective element, an electrochromic reflective element, a windshield moisture sensor, a rain sensor control circuitry, a remote keyless entry system, a navigational aid, and a cellular phone system; and said input device enabling the occupant of the vehicle to at least one of authorize payment and make payment for the remote transaction.

102. The vehicular rearview mirror system according to claim 101, wherein a display is provided at said interior rearview mirror assembly.

103. The vehicular rearview mirror system according to claim 102, wherein said display displays information relating to said remote transaction.

104. The vehicular rearview mirror system according to claim 103, wherein said display displays a menu, said menu including selections for said remote transaction.

105. The vehicle mounted remote transaction interface system according to claim 104, wherein said menu is driven by at least one button, said button being mounted at said interior rearview mirror assembly.

106. The vehicle mounted remote transaction interface system according to claim 105, wherein said button is provided at one of said interior rearview mirror housing, said interior rearview mirror support, and said mirror mount.

107. The vehicle mounted remote transaction interface system according to claim 102, wherein said display comprises a touch activated screen.

108. The vehicle mounted remote transaction interface system according to claim 102, wherein said display is mounted at said interior rearview mirror support.

109. The vehicle mounted remote transaction interface system according to claim 108, wherein said display displays a menu, said menu including selections relating to the remote transaction.

110. The vehicle mounted remote transaction interface system according to claim 109, wherein said menu is driven by at least one button, said button being mounted at said interior rearview mirror assembly.

111. The vehicle mounted remote transaction interface system according to claim 101, wherein said at least one communication signal comprises a secure signal, said secure signal being secure from electronic eavesdropping.

112. The vehicle mounted remote transaction interface system according to claim 101, wherein said input device is provided at one of said interior rearview mirror housing, said interior rearview mirror support, and said mirror mount.

113. The vehicle mounted remote transaction interface system according to claim 112, wherein said input device comprises an alphanumeric key pad and said alphanumeric key pad is provided at one of said interior rearview mirror housing, said interior rearview mirror support, and said mirror mount.

114. The vehicle mounted remote transaction interface system according to claim 112, wherein said input device comprises a card reader and said card reader is provided at one of said interior rearview mirror housing, said interior rearview mirror support, and said mirror mount.

115. The vehicle mounted remote transaction interface system according to claim 114, wherein said card reader comprises a credit card reader.

116. The vehicle mounted remote transaction interface system according to claim 114, wherein said card reader comprises a bank card reader.

117. The vehicle mounted remote transaction interface system according to claim 116, wherein said input device comprises a touch activated screen and said touch activated screen is provided at one of said interior rearview mirror housing, said interior rearview mirror support, and said mirror mount.

118. The vehicular rearview mirror system according to claim 112, wherein said input device includes a plurality of alphanumeric buttons for generating a signal which includes at least one of a personal identification number and a credit card number of the occupant of the vehicle.

119. The vehicular rearview mirror system according to claim 112, wherein said input device comprises a card reader being adapted to read a magnetic strip.

120. The vehicular rearview mirror system according to claim 112, wherein said input device comprises a touch activated screen.

121. The vehicular rearview mirror system according to claim 112, wherein said input device comprises a card reader.

122. The vehicular rearview mirror system according to claim 112, wherein said input device comprises an alphanumeric key pad.

123. The vehicle mounted remote transaction interface system according to claim 112, wherein said input device is provided at one of said interior rearview mirror housing and said interior rearview mirror support.

124. The vehicular rearview mirror system according to claim 102, wherein said input device is at said interior rearview housing.

125. The vehicular rearview mirror system according to claim 101, wherein said transmitter comprises a radio frequency transmitter.

126. The vehicular rearview mirror system according to claim 101, wherein said transmitter comprises an infrared transmitter.

127. The vehicle mounted remote transaction interface system according to claim 101, wherein said vehicle mounted remote transaction interface system includes a first code transmitted by said vehicle mounted remote transaction interface system and a second code transmitted by said vehicle mounted remote transaction interface system, one of said first and second codes associated with an identity of a customer, the other of said first and second codes comprising a personal identification number, and the remote transaction unit engaging in said transaction only when said first code corresponds with said second code.

128. The vehicle mounted remote transaction interface system according to claim 101 further comprising a pod, said pod being mounted at said mirror mount, and said pod including said transceiver.

129. The vehicle mounted remote transaction interface system according to claim 128, wherein said pod includes a card reader coupled to said transceiver.

130. The vehicular rearview mirror system according to claim 101, wherein said antenna comprises a global positioning system antenna.

131. The vehicular rearview mirror system according to claim 101, wherein said navigational aid comprises a global positioning system.

132. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly having an interior rearview mirror housing and an interior rearview mirror reflective element housed in said interior rearview mirror housing, said interior rearview mirror assembly further including an interior rearview mirror support, said interior rearview mirror housing pivotally positionable about said interior rearview mirror support, said interior rearview mirror support attaching to said interior portion of said vehicle by a mirror mount;

a transceiver provided at said interior rearview mirror assembly;

said transceiver provided at said interior rearview mirror assembly including a transmitter for sending at least one communication signal from the vehicle to a remote transaction unit for communication with the remote transaction unit and engaging in a remote transaction with the remote transaction unit;

the remote transaction unit being located exteriorly of the vehicle in which said interior rearview mirror assembly is mounted and the remote transaction unit being operable both to receive communication from said transceiver provided at said interior rearview mirror assembly and to send communication to said transceiver provided at said interior rearview mirror assembly;

said transceiver provided at said interior rearview mirror assembly further including a receiver for receiving at least one signal from the remote transaction unit that is located exteriorly of the vehicle;

a payment being associated with said remote transaction;

an input device provided at said interior rearview mirror assembly in communication with said transceiver and accessible by an occupant of the vehicle during normal use of the vehicle, said input device generating at least one input device signal, said at least one communication signal comprising said input device signal, and said transmitter sending said at least one input device signal from the vehicle to the remote transaction unit located exteriorly of the vehicle, and said input device signal being associated with said payment; and said input device enabling the occupant of the vehicle to at least one of authorize payment and make payment for the remote transaction.

133. The vehicle mounted remote transaction interface system according to claim 132, wherein said input device comprises at least one input device chosen from an alphanumeric key pad, a touch activated device, and a card reader.

134. The vehicle mounted remote transaction interface system according to claim 133, wherein said input device comprises a card reader, and said card reader is provided at one chosen from said interior rearview mirror housing, said interior rearview mirror support, and said mirror mount.

135. The vehicle mounted remote transaction interface system according to claim 134, said card reader being adapted to read a magnetic strip.

136. The vehicle mounted remote transaction interface system according to claim 134, wherein said card reader comprises at least one chosen from a credit card reader and a debit card reader.

137. The vehicle mounted remote transaction interface system according to claim 134, wherein said card reader is provided at said mirror housing.

138. The vehicle mounted remote transaction interface system according to claim 134, wherein said card reader comprises a bank card reader.

139. The vehicle mounted remote transaction interface system according to claim 134, wherein said transmitter comprises a radio frequency transmitter.

140. The vehicle mounted remote transaction interface system according to claim 134, wherein said transmitter comprises an infrared transmitter.

141. The vehicle mounted remote transaction interface system according to claim 134, wherein said input device is at said interior rearview mirror housing.

142. The vehicle mounted remote transaction interface system according to claim 134, wherein said interior rearview mirror assembly includes at least one device chosen from an antenna, a map light, an automatic dimming circuitry, a microphone, a loudspeaker, a windshield moisture sensor, a rain sensor control circuitry, a remote keyless entry system, a navigational aid, and a cellular phone system.

143. The vehicle mounted remote transaction interface system according to claim 134, further comprising a microprocessor, said microprocessor in communication with said input device and said transceiver and processing at least one signal transmitted and/or received by said transceiver.

144. The vehicle mounted remote transaction interface system according to claim 143, wherein said microprocessor controls at least one function chosen from (i) a vehicle cabin environment function, (ii) an automatic headlight activation system function, (iii) an electro-optic mirror element function, (iv) a blind spot detection system function, (v) a compass system function, (vi) an intrusion detection system function, (vii) a vehicle security light function, (viii) a turn signal indicator function, (ix) a keyless entry system function, and (x) a trainable garage door opener system function.

145. The vehicle mounted remote transaction interface system according to claim 143, further comprising a display, said display displaying information related to said remote transaction.

146. The vehicle mounted remote transaction interface system according to claim 145, wherein said display comprises a multi-pixel display.

147. The vehicle mounted remote transaction interface system according to claim 145, wherein said display comprises a scrolling display.

148. The vehicle mounted remote transaction interface system according to claim 145, wherein said display displays a menu, said menu including selections for said remote transaction.

149. The vehicle mounted remote transaction interface system according to claim 148, wherein said menu is driven by at least one button, said button being located at said interior rearview mirror assembly.

150. The vehicle mounted remote transaction interface system according to claim 145, wherein information displayed by said display is processed by said microprocessor.

151. The vehicle mounted remote transaction interface system according to claim 132, wherein said microprocessor processes an output of said input device, said display displaying information related to said output.

152. The vehicle mounted remote transaction interface system according to claim 132, wherein said reflective element comprises an electro-optic reflective element.

153. The vehicle mounted remote transaction interface system according to claim 132, wherein said input device receives user input from an occupant of the vehicle.

154. The vehicle mounted remote transaction interface system according to claim 133, wherein said user input initiates said remote transaction.

155. The vehicle mounted remote transaction interface system according to claim 153, wherein said input device comprises an alphanumeric key pad, said alphanumeric key pad receiving said user input.

156. The vehicle mounted remote transaction interface system according to claim 153, wherein said input device comprises a touch screen, said touch screen adapted to receive said user input.

157. The vehicle mounted remote transaction interface system according to claim 153, wherein said input device comprises a card reader.

158. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly having an interior rearview mirror housing and an interior rearview mirror reflective element housed in said interior rearview mirror housing, said interior rearview mirror assembly further including an interior rearview mirror support, said interior rearview mirror housing pivotally positionable about said interior rearview mirror support, said interior rearview mirror support attaching to said interior portion of said vehicle by a mirror mount;

a transceiver provided at said interior rearview mirror assembly;

said transceiver provided at said interior rearview mirror assembly including a transmitter for sending at least one communication signal from the vehicle to a remote transaction unit for communication with the remote transaction unit and engaging in a remote transaction with the remote transaction unit in response to input from an input device;

said input device provided at said interior rearview mirror assembly in communication with said transceiver and accessible by the occupant during normal use of the vehicle, said input device comprising at least one of an alphanumeric key pad, a touch activated screen, and a card reader, and said input device generating at least one input device signal, and said at least one communication signal comprising said input device signal;

the remote transaction unit being located exteriorly of the vehicle in which said interior rearview mirror assembly is mounted and the remote transaction unit being operable both to receive communication from said transceiver provided at said interior rearview mirror assembly and to send communication to said transceiver provided at said interior rearview mirror assembly;

said transceiver provided at said interior rearview mirror assembly further including a receiver for receiving at least one signal from the remote transaction unit that is located exteriorly of the vehicle, and said transceiver for transmitting said at least one input signal to the remote transaction unit;

said interior rearview mirror assembly including a display device, said display device displaying information associated with said remote transaction; and said input device enabling the occupant of the vehicle to at least one of authorize payment and make payment for the remote transaction.

159. The vehicle mounted remote transaction interface system according to claim 158, wherein said display device is viewable by an occupant of a vehicle.

160. The vehicle mounted remote transaction interface system according to claim 159, wherein said display device comprises a touch activated display screen.

161. The vehicle mounted remote transaction interface system according to claim 159, wherein said input device comprises an alphanumeric key pad.

162. The vehicle mounted remote transaction interface system according to claim 159, wherein said input device comprises a card reader, and said card reader is provided at one of said interior rearview mirror housing, said interior rearview mirror support, and said mirror mount.

163. The vehicle mounted remote transaction interface system according to claim 159, wherein said input device is at said interior rearview mirror housing.

164. The vehicle mounted remote transaction interface system according to claim 159, wherein said interior rearview mirror assembly includes at least one device chosen from an antenna, a map light, an automatic dimming circuitry, a microphone, a loudspeaker, a windshield moisture sensor, a rain sensor control circuitry, a remote keyless entry system, a navigational aid, and a cellular phone system.

165. The vehicle mounted remote transaction interface system according to claim 159, further comprising a microprocessor, said microprocessor in communication with said input device and said transceiver and processing at least one signal transmitted and/or received by said transceiver.

166. The vehicle mounted remote transaction interface system according to claim 165, wherein said microprocessor controls at least one function chosen from (i) a vehicle cabin environment function, (ii) an automatic headlight activation system function, (iii) an electro-optic mirror element function, (iv) a blind spot detection system function, (v) a compass system function, (vi) an intrusion detection system function, (vii) a vehicle security light function, (viii) a turn signal indicator function, (ix) a keyless entry system function, and (x) a trainable garage door opener system function.

167. The vehicle mounted remote transaction interface system according to claim 158, wherein said display device displays a menu, said menu displaying information related to said remote transaction.

168. The vehicle mounted remote transaction interface system according to claim 167, wherein said menu is driven by at least one button, said button being mounted at said interior rearview mirror assembly.

169. The vehicle mounted remote transaction interface system according to claim 168, wherein said button is provided at one chosen from said interior rearview mirror housing, said interior rearview mirror support, and said mirror mount.

170. The vehicle mounted remote transaction interface system according to claim 158, wherein said transmitter comprises a radio frequency transmitter.

171. The vehicle mounted remote transaction interface system according to claim 158, wherein said transmitter comprises an infrared transmitter.

172. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly having an interior rearview mirror housing and an interior rearview mirror reflective element housed in said interior rearview mirror housing, said interior rearview mirror assembly further including an interior rearview mirror support, said interior rearview mirror housing pivotally positionable about said interior rearview mirror support, said interior rearview mirror support adapted to mount to said interior portion of said vehicle;

a transceiver provided at said interior rearview mirror assembly;

said transceiver provided at said interior rearview mirror assembly including a transmitter for sending at least one vehicle-based communication signal from said vehicle to a remote transaction unit for communication with the remote transaction unit and for engaging in a remote transaction with the remote transaction unit;

the remote transaction unit being located exteriorly of the vehicle in which said interior rearview mirror assembly is mounted and the remote transaction unit being operable both to receive communication from said transceiver provided at said interior rearview mirror assembly and to send communication to said transceiver provided at said interior rearview mirror assembly;

said transceiver provided at said interior rearview mirror assembly further including a receiver for receiving at least one signal from the remote transaction unit that is located exteriorly of the vehicle;

an input device provided at said interior rearview mirror assembly associated with said remote transaction with the remote transaction unit and accessible by an occupant of the vehicle during normal use of the vehicle, said input device generating at least one input device signal, and said at least one vehicle-based communication signal comprising said input device signal, and said transmitter sending said at least one input device signal from the vehicle to the remote transaction unit located exteriorly of the vehicle; and a display device provided at said interior rearview mirror assembly associated with said remote transaction with the remote transaction unit;

a microprocessor, said microprocessor processing at least one signal transmitted and/or received by said transceiver;

wherein said microprocessor controls at least one function chosen from (i) a vehicle cabin environment function, (ii) an automatic headlight activation system function, (iii) an electro-optic mirror element function, (iv) a blind spot detection system function, (v) a compass system function, (vi) an intrusion detection system function, (vii) a light function, (viii) a turn signal indicator function, (ix) a keyless entry system function, and (x) a trainable garage door opener system function; and said input device enabling the occupant of the vehicle to at least one of authorize payment and make payment for the remote transaction.

173. The vehicle mounted remote transaction interface system according to claim 172, wherein at least one chosen from said input device and said display is located at said interior rearview mirror housing.

174. The vehicle mounted remote transaction interface system according to claim 172, wherein said input device comprises at least one chosen from an alphanumeric key pad, a touch activated screen, and a card reader, said input device for input of data related to said remote transaction.

175. The vehicle mounted remote transaction interface system according to claim 174, wherein said data includes at least one chosen from: A) a personal identification number; B) a credit card number; and C) a banking card number.

176. The vehicle mounted remote transaction interface system according to claim 175, wherein said transceiver transmits said data to the remote transaction unit.

177. The vehicle mounted remote transaction interface system according to claim 176, wherein said data comprises data obtained from at least one of: A) a credit card; B) a debit card; and C) a bank card, and said transceiver transmits said data in association with payment for said remote transaction.

178. The vehicle mounted remote transaction interface system according to claim 172, wherein an occupant of the vehicle may engage in said remote transaction without exiting the vehicle or opening a window of the vehicle.

179. The vehicle mounted remote transaction interface system according to claim 178, wherein said input device comprises a card reader for reading a card chosen from: A) a credit card; B) a debit card; and C) a bank card.

180. The vehicle mounted remote transaction interface system according to claim 179, wherein said input device comprises a card reader adapted to permit an occupant of the vehicle to insert a credit card, a bank card, or a debit card for payment of said remote transaction.

181. The vehicle mounted remote transaction interface system according to claim 172, wherein said vehicle-based communication signal comprises a signal chosen from: A) a radio frequency signal; B) a microwave signal; and C) an infrared signal.

182. The vehicle mounted remote transaction interface system according to claim 172, wherein said transceiver transmits an initial signal code representing an identification of at least one of the owner of the vehicle and of the vehicle.

183. The vehicle mounted remote transaction interface system according to claim 172, wherein said vehicle-based communication signal comprises a secure signal.

184. The vehicle mounted remote transaction interface system according to claim 172, wherein said input device comprises an alphanumeric key pad.

185. The vehicle mounted remote transaction interface system according to claim 172, further comprising at least one device chosen from an antenna, a map light, an automatic dimming circuitry, a microphone, a loud speaker, a windshield moisture sensor, a rain sensor control circuitry, a remote keyless entry system, a navigational aid, and a cellular phone system.

186. A vehicle mounted remote transaction interface system for engaging in a remote transaction between an occupant of the vehicle and a remote transaction unit, said system comprising:

an interior rearview mirror assembly attached to an interior portion of a vehicle, said interior rearview mirror assembly having an interior rearview mirror housing and an interior rearview mirror reflective element housed in said interior rearview mirror housing, said interior rearview mirror assembly further including an interior rearview mirror support, said interior rearview mirror housing pivotally positionable about said interior rearview mirror support, said interior rearview mirror support adapted to mount to said interior portion of said vehicle;

said reflective element comprising an electro-optic reflective element;

a transceiver provided at said interior rearview mirror assembly;

said transceiver provided at said interior rearview mirror assembly including a transmitter for sending at least one vehicle-based communication signal from said vehicle to a remote transaction unit for communication with the remote transaction unit and for engaging in a remote transaction with the remote transaction unit, the remote transaction unit being located exteriorly of the vehicle in which said mirror assembly is installed;

the remote transaction unit being located exteriorly of the vehicle in which said interior rearview mirror assembly is mounted and the remote transaction unit being operable both to receive communication from said transceiver provided at said interior rearview mirror assembly and to send communication to said transceiver provided at said interior rearview mirror assembly;

said transceiver provided at said interior rearview mirror assembly further including a receiver for receiving signals from the remote transaction unit that is located exteriorly of the vehicle;

an input device provided at said interior rearview mirror assembly and accessible by an occupant of the vehicle during normal use of the vehicle, said input device being in communication with said transceiver and generating an input signal, and said transmitter sending said vehicle-based communication signal based on said input signal;

a display device provided at said interior mirror assembly, said display device displaying information associated with said remote transaction; and said input device enabling the occupant of the vehicle to at least one of authorize payment and make payment for the remote transaction.

187. The vehicle mounted remote transaction interface system according to claim 186, wherein said input device is at said interior rearview mirror housing.

188. The vehicle mounted remote transaction interface system according to claim 186, wherein said input device comprises at least one device chosen from an alphanumeric key pad, a touch activated device, and a card reader.

189. The vehicle mounted remote transaction interface system according to claim 188, wherein said input device comprises a card reader, and said card reader is provided at one of said interior rearview mirror housing, said interior rearview mirror support, and said mirror mount.

190. The vehicle mounted remote transaction interface system according to claim 186, further comprising a microprocessor, said microprocessor in communication with said input device and said transceiver and processing at least one signal transmitter and/or received by said transceiver.

191. The vehicle mounted remote transaction interface system according to claim 190, wherein said microprocessor controls at least one function chosen from (i) a vehicle cabin environment function, (ii) an automatic headlight activation system function, (iii) an electro-optic mirror element function, (iv) a blind spot detection system function, (v) a compass system function, (vi) an intrusion detection system function, (vii) a vehicle security light function, (viii) a turn signal indicator function, (ix) a keyless entry system function, and (x) a trainable garage door opener system function.

192. The vehicle mounted remote transaction interface system according to claim 186, wherein said display comprises a multi-pixel display.

193. The vehicle mounted remote transaction interface system according to claim 186, wherein said display comprises a scrolling display.

194. The vehicle mounted remote transaction interface system according to claim 186, wherein said display displays a menu, said menu including selections for said remote transaction.

195. The vehicle mounted remote transaction interface system according to claim 194, wherein said menu is driven by at least one button, said button being located at said interior rearview mirror assembly.

196. The vehicle mounted remote transaction interface system according to claim 186, wherein said input initiates said remote transaction.

197. The vehicle mounted remote transaction interface system according to claim 196, wherein said input device comprises an alphanumeric key pad, said alphanumeric key pad receiving said input.

198. The vehicle mounted remote transaction interface system according to claim 186, wherein said transmitter comprises a radio frequency transmitter.

199. The vehicle mounted remote transaction interface system according to claim 186, wherein said transmitter comprises an infrared transmitter.

* * * * *

UNITED STATES PATENT AND TRADEMARK OFFICE
CERTIFICATE OF CORRECTION

| | | |
|---|---|---|
| PATENT NO. | : 6,547,133 B1 | |
| APPLICATION NO. | : 09/687778 | |
| DATED | : April 15, 2003 | |
| INVENTOR(S) | : Martin DeVries, Jr. and Niall R. Lynam | |

It is certified that error appears in the above-identified patent and that said Letters Patent is hereby corrected as shown below:

Column 4
Line 47, "with" should be --which--

Column 5
Line 4, "Donelly" should be --Donnelly--
Line 61, "are" should be --area--

Column 6
Line 54, "Donelly" should be --Donnelly--

Column 7
Line 44, Insert --W-- after "windshield"
Line 66, "comprise" should be --comprises--

Column 8
Line 27, "28" should be --228--

Column 10
Line 63, "of" should be --or-- in the first occurrence

Column 13
Line 2, Claim 1, "circuit" should be --mount--
Line 42, Claim 4, "2" should be --3--
Line 56, Claim 8, "2" should be --3--

Column 18
Line 31, Claim 69, "communication" should be "communicating"

Signed and Sealed this
Seventeenth Day of July, 2012

David J. Kappos
*Director of the United States Patent and Trademark Office*

CERTIFICATE OF CORRECTION (continued)
U.S. Pat. No. 6,547,133 B1

Column 22
Line 16, Claim 117, "116" should be --112--
Line 43, Claim 124, "102" should be --112--
Line 44, Claim 124, Insert --mirror-- after "rearview"

Column 24
Line 12, Claim 139, "134" should be --132--
Line 15, Claim 140, "134" should be --132--
Line 18, Claim 141, "134" should be --132--
Line 21, Claim 142, "134" should be --132--
Line 29, Claim 143, "134" should be --132--
Line 66, Claim 151, "132" should be --150--

Column 25
Line 8, Claim 154, "133" should be --153--
Line 27, Claim 158, "having" should be --including--

Column 30
Line 5, Claim 190, "transmitter" should be --transmitted--